(12) United States Patent
Nishikawa

(10) Patent No.: US 8,144,345 B2
(45) Date of Patent: Mar. 27, 2012

(54) INFORMATION-PROCESSING APPARATUS AND METHOD

(75) Inventor: Satoshi Nishikawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 977 days.

(21) Appl. No.: 12/118,383

(22) Filed: May 9, 2008

(65) Prior Publication Data

US 2008/0309971 A1    Dec. 18, 2008

(30) Foreign Application Priority Data

Jun. 13, 2007  (JP) ................. 2007-156738

(51) Int. Cl.
*G06F 15/00* (2006.01)
*G03G 15/00* (2006.01)

(52) U.S. Cl. ..................... 358/1.13; 399/82

(58) Field of Classification Search ............. 358/1.15, 358/1.13, 1.14, 1.18, 1.17, 1.9, 498, 403, 358/474, 296; 270/1.01, 1.02, 1.13, 58.01, 270/12; 715/274, 255, 221, 201; 399/82, 399/408, 407, 405
See application file for complete search history.

(56) References Cited

U.S. PATENT DOCUMENTS

| 6,857,796 | B2 | 2/2005 | Hatayama |
| 2002/0051194 | A1 | 5/2002 | Sakura |
| 2002/0059338 | A1 | 5/2002 | Nishikawa |
| 2006/0061793 | A1* | 3/2006 | Nishikawa et al. .......... 358/1.13 |
| 2007/0081180 | A1 | 4/2007 | Abiko |

FOREIGN PATENT DOCUMENTS

| EP | 1 264 709 A1 | 12/2002 |
| EP | 1 455 266 A2 | 9/2004 |
| JP | 2002-82791 A | 3/2002 |
| JP | 2002-361967 A | 12/2002 |
| JP | 2003-223290 A | 8/2003 |
| JP | 2003-296070 A | 10/2003 |
| JP | 2004-64453 A | 2/2004 |
| JP | 2007-060097 A | 3/2007 |
| KR | 10-2007-0038920 A | 4/2007 |

OTHER PUBLICATIONS

Office Action issued in corresponding Korean Patent Application No. 10-2008-0044161 dated Nov. 27, 2009.
Extended European Search Report issued on Jun. 18, 2009 in corresponding European Patent Application No. 08156114.4.
Office Action Issued in Counterpart Japanese Patent Application 2007-156738 dated Nov. 25, 2011.

* cited by examiner

*Primary Examiner* — Saeid Ebrahimi Dehkordy
(74) *Attorney, Agent, or Firm* — Rossi, Kimms & McDowell LLP

(57) ABSTRACT

According to the claimed invention, an information-processing apparatus capable of communicating with a printing apparatus, comprises: a setting unit (S2201), configured to set, as part of a print setting when printing document data that includes a plurality of pages to print, a bookbinding setting for casing a sheet printed with a page to be used for a body out of the plurality of pages with a sheet printed with a page to be used for a front cover out of the plurality of pages; and a generator (S2211, S2212), configured to generate, if the bookbinding setting is set, body print data for repeatedly printing, in collated form, a first page to a last page of the body in the document data for a specified plurality of copies, and front cover print data for printing the front cover for a number of sheets equivalent to the specified plurality of copies.

8 Claims, 27 Drawing Sheets

FIG. 4A

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | DOCUMENT / FIXED | · Z-FOLD IS SPECIFIED WHEN "A4+A3", "B4+B3", "LETTER+LEDGER (11×17)" IS SPECIFIED<br>· DOCUMENT SIZE OF FIRST CHAPTER / PAGE IS AUTOMATICALLY SELECTED WHEN BOOKBINDING PRINTING OR N-up PRINTING IS SPECIFIED |
| 3 | PAPER ORIENTATION | PORTRAIT / LANDSCAPE | · AVAILABLE ONLY FOR FIXED SIZE |
| 4 | BINDING MARGIN / BINDING DIRECTION | | · SHIFT / SCALING CAN BE SPECIFIED |
| 5 | N-up PRINTING | NO. OF PAGES / LAYOUT ORDER / BOUNDARY / LAYOUT POSITION, ETC. | · LAYOUT POSITION : 9 PATTERNS<br>· X1 PRINTING IS AVAILABLE |
| 6 | SCALING | ON / OFF | · ON / OFF CAN BE AUTOMATICALLY SPECIFIED WHEN PAPER SIZE IS FIXED SIZE OR N-up PRINTING IS SELECTED |
| 7 | WATERMARK | | · WATERMARKS CAN BE SPECIFIED SEPARATELY IN UNITS OF LOGICAL OR PHYSICAL PAGES<br>· CAN BE SPECIFIED FOR ANY CHAPTER / PAGE |
| 8 | HEADER / FOOTER | | · HEADERS / FOOTERS CAN BE SPECIFIED SEPARATELY IN UNITS OF LOGICAL OR PHYSICAL PAGES<br>· CAN BE SPECIFIED FOR ANY CHAPTER / PAGE |

FIG. 4B

| | | | |
|---|---|---|---|
| 9 | DISCHARGE METHOD | STAPLE / PUNCH HOLE | • STAPLING / PUNCHING ONLY IN SINGLE- / DOUBLE-SIDED PRINTING<br>• STAPLING AT 1 OR 2 POSITIONS |
| 10 | BOOKBINDING DETAILS | OPENING DIRECTION / SADDLE STITCH / SCALING SETTING / BINDING MARGIN / FASCICLE SETTING, ETC. | • ONLY IN BOOKBINDING PRINTING |
| 11 | FRONT / BACK COVER | | • PRINTING IS SPECIFIED FOR 1/2 FRONT COVER OR 1/2 BACK COVER<br>• FEED PORT (INCLUDING INSERTER) CAN BE SPECIFIED |
| 12 | INDEX SHEET | | • PRINTING OF CHARACTER STRING ON INDEX PORTION OR ANNOTATION ON INDEX SHEET CAN BE SET<br>• BOOKBINDING PRINTING CANNOT BE SPECIFIED |
| 13 | SLIP SHEET | | • FEED PORT (INCLUDING INSERTER) CAN BE SPECIFIED<br>• DOCUMENT DATA CAN BE PRINTED ON INSERTED PAPER<br>• BOOKBINDING PRINTING CANNOT BE SPECIFIED |
| 14 | CHAPTERING | "NONE" / "PAGE BREAK" / "PAPER CHANGE" | • "PAPER CHANGE" IS FIXED WHEN INDEX SHEET OR SLIP SHEET IS SPECIFIED<br>• "PAPER CHANGE" IN SINGLE-SIDED PRINTING |

FIG. 5

| NO | ATTRIBUTE INFORMATION | | REMARKS |
|---|---|---|---|
| 1 | SHEET SIZE | DOCUMENT / FIXED | • "PAPER CHANGE" IS AUTOMATICALLY SPECIFIED WHEN FIXED SIZE IS SELECTED<br>• WHEN A PLURALITY OF SHEETS ARE SELECTED WITH BOOK, PAPER SIZE CAN BE CHANGED TO ONLY SPECIFIED PAPER, PAPER SIZE CAN BE CHANGED EVEN WITH A SPECIFICATION COMPLYING WITH A BOOK |
| 2 | PAPER ORIENTATION | PORTRAIT / LANDSCAPE | • AVAILABLE ONLY FOR FIXED SIZE |
| 3 | N-up PRINTING | NO. OF PAGES / LAYOUT ORDER / BOUNDARY / LAYOUT POSITION, ETC. | • LAYOUT POSITION: 9 PATTERNS<br>• X1 PRINTING IS AVAILABLE |
| 4 | SCALING | ON / OFF | • ON / OFF CAN BE AUTOMATICALLY SPECIFIED WHEN PAPER SIZE IS FIXED SIZE OR N-up PRINTING IS SELECTED |
| 5 | WATERMARK | DISPLAY / HIDE | • WHETHER TO DISPLAY ALL WATERMARKS SPECIFIED WITH BOOK IS SPECIFIED |
| 6 | HEADER / FOOTER | DISPLAY / HIDE | • WHETHER TO DISPLAY ALL HEADERS / FOOTERS SPECIFIED WITH BOOK IS SPECIFIED |
| 7 | DISCHARGE METHOD | STAPLE | • STAPLE CAN BE SET TO OFF WHEN STAPLE IS SPECIFIED WITH BOOK (DEFAULT IS ON) |

FIG. 6

| NO | ATTRIBUTE INFORMATION | | REMARKS |
|----|----------------------|--|---------|
| 1 | PAGE ROTATION SPECIFICATION | | • 0 / 90 / 180 / 270° CAN BE SPECIFIED |
| 2 | WATERMARK | DISPLAY / HIDE | • WHETHER TO DISPLAY ALL WATERMARKS SPECIFIED WITH BOOK IS SPECIFIED |
| 3 | HEADER / FOOTER | DISPLAY / HIDE | • WHETHER TO DISPLAY ALL HEADERS / FOOTERS SPECIFIED WITH BOOK IS SPECIFIED |
| 4 | ZOOM | 50%–200% | • MAGNIFICATION RELATIVE TO 100% SIZE FITTING VIRTUAL LOGICAL PAGE AREA CAN BE SPECIFIED |
| 5 | LAYOUT POSITION | | • 9 FIXED PATTERNS & ARBITRARY POSITION CAN BE SPECIFIED |
| 6 | ANNOTATION | | |
| 7 | VARIABLE ITEM | | |
| 8 | PAGE DIVISION | | |

FIG. 25

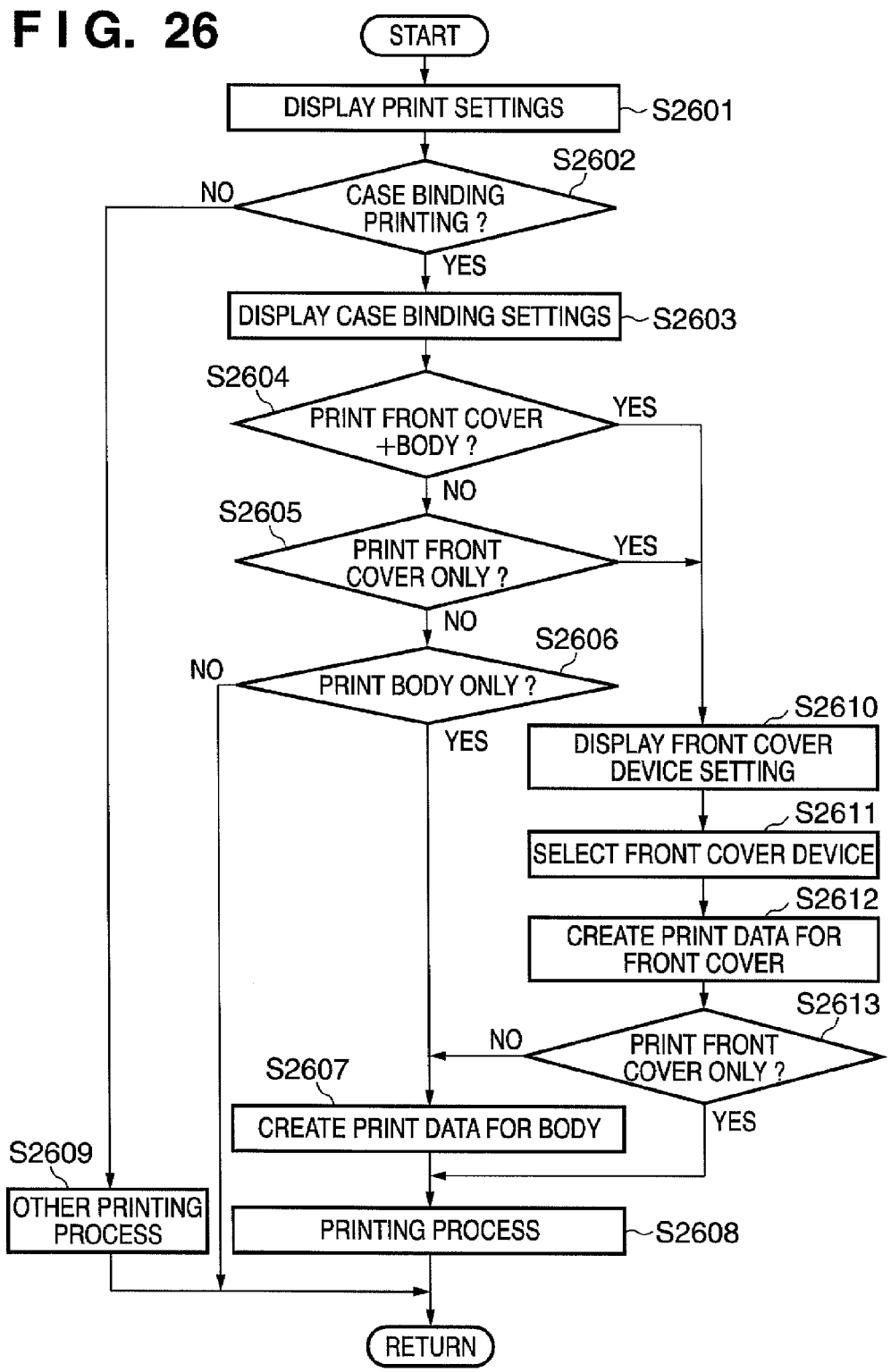

INFORMATION-PROCESSING APPARATUS AND METHOD

BACKGROUND OF THE INVENTION

1. Field of the Invention

The present invention relates to an information-processing apparatus and method for generating print data, for example, and more particularly to an information-processing apparatus and method for generating print data that can be submitted to a bookbinding process as post-processing.

2. Description of the Related Art

There are information-processing apparatuses such as personal computers for generating print data that have a spool function of saving document data with an intermediate code of a different format to the print data ultimately sent to the printing apparatus, prior to the print data being generated. With some of these information-processing apparatuses, the layout and the output order of pages can be changed when print data to be sent to the printing apparatus is generated from the document data saved in the intermediate code format. This function enables print data to be generated from document data set for bookbinding in a layout that takes into account the sequence of pages after binding. There are also information-processing apparatuses that have a variable printing function of predetermining a frame (area) in which variable data is to be inserted in saved document data, and inserting the variable data in the frame when print data is generated (e.g., see Japanese Patent Laid-Open No. 2003-296070).

There are also apparatuses that generate print data that assumes the use of a bookbinding device which performs bookbinding on a printed document. One mode of bookbinding is case binding, which involves wrapping the body with a sheet laid out with the data of the front and back covers, with a digital copying apparatus having been proposed that outputs the front cover and body for use in a case binding device (e.g., see Japanese Patent Laid-Open No. 2004-64453).

However, in the case where print data is generated from document data set for bookbinding by the information-processing apparatus disclosed in Japanese Patent Laid-Open No. 2003-296070, print data compatible with case binding performed by a bookbinding device that is not an inline book-binding device cannot be generated. An inline book-binding device incorporates a printing apparatus and performs bookbinding on a printed document output from the printing apparatus.

Also, the digital copier disclosed in Japanese Patent Laid-Open No. 2004-64453 is not able to output a printed document compatible with a case-binding device which performs bookbinding on front cover and body sheets imported from separate setting locations.

FIG. 20 shows an example of bookbinding performed on front cover and body sheets imported from separate setting locations. In the case of binding N copies of a printed document, a book-binding device that is not an inline book-binding device accepts a stack 2001 of N front covers and N copies of the body 2002 output in collated form. Then, one front cover is imported from the stack 2001 of front covers, one copy of the body is imported from the body 2002, the body is cased with the front cover, and bookbinding is performed using staples or the like. Since the body and the front cover do not need to be set manually with an inline book-binding device, the bookbinding method shown in FIG. 20 is employed with an off-line bookbinding device that is not connected to a printing apparatus or with a near-line bookbinding device that may have a communication connection but does not incorporate a printing apparatus.

With the foregoing information-processing apparatus and digital copier, the front cover and the body that should be output as one copy cannot be output separately in collated form. Thus, if the case binding function of an off-line bookbinding device or a near-line bookbinding device is used, the output of the printing apparatus needs to be sorted into front cover and body before being set in the bookbinding device.

Heretofore, it was problematic to print the front cover and the body on separate printing apparatuses, such as printing the front cover on a color printing apparatus and the body on a monochrome printing apparatus, for example. Consequently, if printing had to be done on separate printing apparatuses, the user had to input a print instruction from the information-processing apparatus to each of the printing apparatuses and execute the printing as separate print jobs.

To generate separate print jobs as described above, the user selects the portion to print from the document data and instructs printing in relation to the selected portion. This method is disadvantageous in that it takes time and effort to specify the front cover and body from document data, and is also susceptible to error.

SUMMARY OF THE INVENTION

The present invention has been made in consideration of the above conventional examples, and has as its object to provide an information-processing apparatus and method capable of generating print data separately for a front cover portion and a body portion, in the case where a bookbinding setting, and particularly a case binding setting, is specified as a print setting.

According to a first aspect of the present invention there is provided an information-processing apparatus, comprising:
  a setting unit to set, as part of a print setting when printing document data that includes a plurality of pages to print, a bookbinding setting for causing a printed page, to be used for a body out of the plurality of printed pages, to be cased with a printed page, to be used for a front cover out of the plurality of printed pages; and
  a generating unit to generate, if the bookbinding setting is set, body print data for repeatedly printing, in collated form, a first page to a last page of the body in the document data for a specified plurality of copies, and front cover print data for printing the front cover for a number of sheets equivalent to the specified plurality of copies.

According to a second aspect of the present invention there is provided an information-processing method for an information-processing apparatus, comprising:
  setting, as part of a print setting when printing document data that includes a plurality of pages to print, a bookbinding setting for causing a printed page, to be used for a body out of the plurality of printed pages, to be cased with a printed page, to be used for a front cover out of the plurality of printed pages; and
  generating, if the bookbinding setting is set, body print data for repeatedly printing, in collated form, a first page to a last page of the body in the document data for a specified plurality of copies, and front cover print data for printing the front cover for a number of sheets equivalent to the specified plurality of copies.

According to a third aspect of the present invention there is provided a storage medium storing a computer program for causing an information-processing apparatus to perform a method comprising:

setting, as part of a print setting when printing document data that includes a plurality of pages to print, a bookbinding setting for causing a printed page, to be used for a body out of the plurality of printed pages, to be cased with a printed page, to be used for a front cover out of the plurality of printed pages; and generating, if the bookbinding setting is set, body print data for repeatedly printing, in collated form, a first page to a last page of the body in the document data for a specified plurality of copies, and front cover print data for printing the front cover for a number of sheets equivalent to the specified plurality of copies.

According to a fourth aspect of the present invention there is provided an information-processing apparatus, comprising:

setting means for setting, as part of a print setting when printing document data that includes a plurality of pages to print, a bookbinding setting for causing a printed page, to be used for a body out of the plurality of printed pages, to be cased with a printed page, to be used for a front cover out of the plurality of printed pages; and generating means for generating, if the bookbinding setting is set, body print data for repeatedly printing, in collated form, a first page to a last page of the body in the document data for a specified plurality of copies, and front cover print data for printing the front cover for a number of sheets equivalent to the specified plurality of copies.

The above configurations enable print data set for bookbinding to be generated separately for the body and the front cover.

Additional features of the present invention will become apparent from the following description of exemplary embodiments, taken in conjunction with the accompanying drawings.

BRIEF DESCRIPTION OF THE DRAWINGS

FIGS. 4A and 4B show a list of book attributes.

FIG. 5 shows a list of chapter attributes.

FIG. 6 shows a list of page attributes.

FIG. 25 shows an exemplary user interface used in the preferred embodiments.

FIG. 26 is a flowchart of a method used in the preferred embodiments.

DESCRIPTION OF THE EMBODIMENTS

Hereinafter, preferred embodiments according to the present invention will be described in detail with reference to the drawings.

System Overview

Firstly, an overview of a document-processing system according to the present invention will be described below with reference to FIGS. 1 to 12. Note that this document-processing system includes an electronic document writer that converts a data file created by a generic application to an electronic document file, and a bookbinding application that provides a function of editing the electronic document file. It is possible to create and edit a document that consolidates data created by this software, enabling operability to be improved and document editing to be performed efficiently.

System Configuration and Operations

Figure 1:
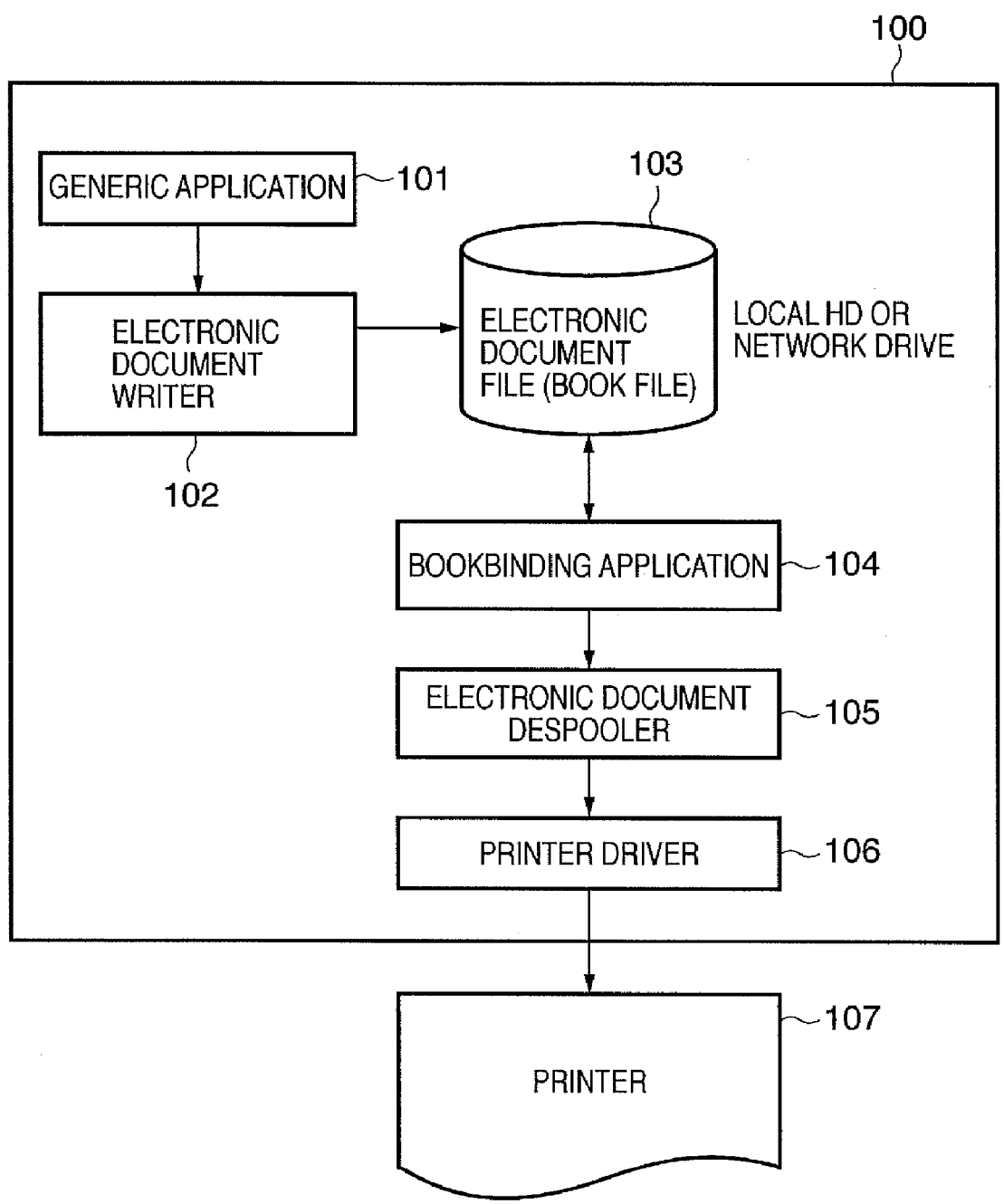
FIG. 1 is a block diagram showing an exemplary software configuration of a standalone document-processing system of preferred embodiments.

FIG. 1 shows a software configuration of the document-processing system of the present embodiment. The document-processing system is realized by a digital computer 100 (hereinafter, also called a host computer), which is a preferred embodiment of a document-processing apparatus of the present invention. Applications 101 shown in FIG. 1 provide functions such as word processing, spreadsheet, photo retouch, draw, paint, presentation, text editing and the like, and have a printing function with respect to the operating system (OS). These applications 101 use a prescribed interface provided by the OS, when printing application data such as created document data and image data. A Microsoft Windows (register trademark) operating system (OS), for example, has an interface called the Graphics Device Interface (GDI). There is also an interface called the Windows (registered trademark) Presentation Foundation (WPF). That is, the applications 101 transmit an output command (function) of a predetermined format to an output module that provides the above interface, in order to print created data. On the other hand, the output module converts the received output command to a format processable by an output device such as a printer, and outputs the converted command (called a DDI function in the case of GDI). Since the format processable by the output device differs depending on the device type, manufacturer, model and the like, a device driver is provided for every device. A print job is generated by converting the command using a corresponding device driver in the OS, generating print data, and bundling the print data with a job language (JL). If Microsoft Windows is used as the OS, the interface provided by the output module will be equivalent to GDI or WPF.

An electronic document writer 102, which is one of the device drivers, is a software module provided in order to realize the document-processing system. The electronic document writer 102 is not, however, intended for a specific output device, but rather converts output commands to a format processable by a bookbinding application 104 and a printer driver 106. The format (hereinafter, electronic document format) converted to by the electronic document writer 102 is not particularly limited, provided that a document in page units can be represented with a detailed style. Substantive standard formats that can be employed as the electronic document format include, for example, Portable Document Format (PDF) by Adobe Systems, and Scalable Vector Graphics (SVG). XML Paper Specification (XPS) format can also be employed.

In the case where the electronic document writer 102 is used by a generic application 101, printing is executed after specifying the electronic document writer 102 as the device driver to be used for output. An electronic document file newly created by the electronic document writer 102 is not, however, provided fully formatted as an electronic document file. Therefore, it is the bookbinding application 104 that specifies the electronic document writer 102 as the device driver, and the conversion of application data to an electronic document file is executed under the management of the bookbinding application 104. The bookbinding application 104 completes the incomplete electronic document file newly created by the electronic document writer 102 as an electronic document file having a format described below. Hereinafter, when this point needs to be clearly identified, the file created by the electronic document writer 102 will be called an "electronic document file", while the electronic document file provided with structure by the bookbinding application 104 will be called a "book file". When a distinction does not particularly need to made, document files generated by applications, electronic document files and book files will all be referred to as document files (or document data).

The electronic document writer 102 is thus specified as the device driver, and the user is able to specify printing of data created by a generic application 101. In this way, application data is converted to an electronic document format in pages (hereinafter, called logical pages or document pages) defined by the application 101, and stored as an electronic document file 103 in a storage medium such as a hard disk. Note that the hard disk may be a local drive included in a computer that realizes the document-processing system of the present embodiment, or a drive provided on a network if the computer is connected to a network.

The bookbinding application 104 provides the user with a function of reading the electronic document file (or book file) 103, and editing the read file. While the bookbinding application 104 provides a function of editing the structure of a chapter or a book (described below) configured with a page as the smallest unit, it does not, however, provide a function of editing the content of each page. When printing a book file 103 edited by the bookbinding application 104, an electronic document despooler 105 is activated by the bookbinding application 104. The electronic document despooler 105 is a program module installed on the computer together with the bookbinding application. The electronic document despooler 105 is used for outputting draw data to a printer driver, when printing a document (book file) used by the bookbinding application. The electronic document despooler 105 reads the specified book file from the hard disk, and generates an output command compatible with the output module of the OS, in order to print the pages in the format described in the book file, and outputs the generated output command to the output module (not shown). At this time, a printer driver 106 for a printer 107 to be used as the output device is specified as the device driver. The output module converts the received output command to a device command, and outputs the device command to the printer driver 106 for the specified printer 107, and the printer driver 106 converts the received drive command to a command in a page description language or the like that can be interpreted and executed by the printer 107. The converted command is transmitted from the printer driver 106 to the printer 107 via a system spooler (not shown), and an image is printed by the printer 107 according to the command.

Figure 2:
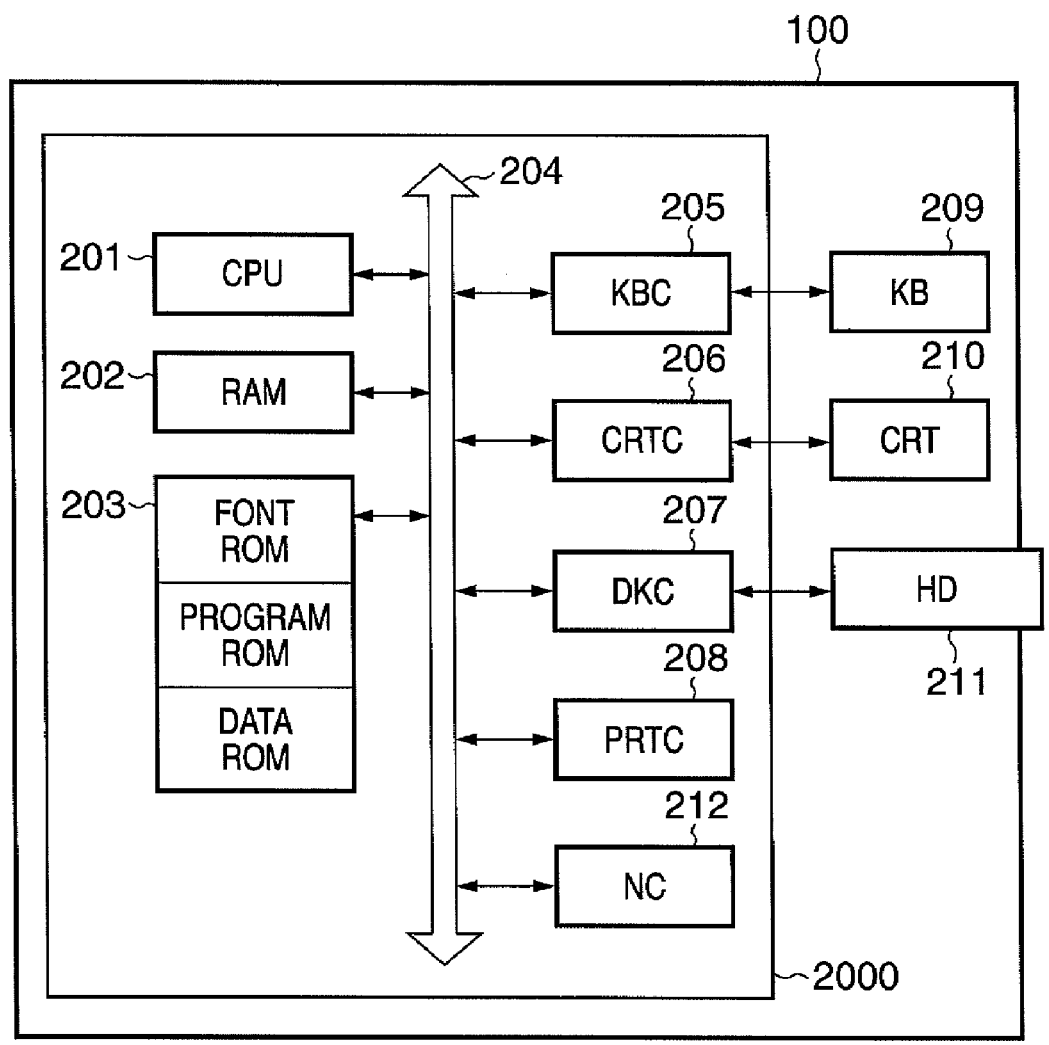
FIG. 2 is a block diagram showing an exemplary hardware configuration that realizes the document-processing system of preferred embodiments.

FIG. 2 is a hardware block diagram of the computer (information-processing apparatus) 100. In FIG. 2, a CPU 201 executes computer programs of the OS, generic applications, bookbinding application, and the like, and realizes the software configuration of FIG. 1 and the procedures of flowcharts (described below). These programs are stored in a program ROM of a ROM 203, or loaded from a hard disk (HD) 211 into a RAM 202. The RAM 202 functions as a work area and a main memory of the CPU 201. A keyboard controller (KBC) 205 controls key input from a keyboard 209 and a pointing device (not shown). A CRT controller (CRTC) 206 controls display of a CRT display 210. A disk controller (DKC) 207 controls access to the hard disk (HD) 211, flexible disks (FD), and the like for storing boot programs, applications, font data, user files, and edited files (described below). A printer controller (PRTC) 208 controls signal exchange with the connected printer 107. A network controller (NC) 212 is connected to a network and executes a communication control process with other devices connected to the network.

Electronic Document Data Format

The data format of a book file will be described before referring in detail to the bookbinding application 104. A book file has a three-layer structure modeled on a printed book. Firstly, the upper layer, called the "book", is modeled on a book, and attributes relating to the overall book are defined therein. The middle layer is equivalent to a chapter in a book, and is naturally called the "chapter". Attributes can be defined for each chapter. The bottom layer is the "page", and is equivalent to the pages defined in an application program. Note that attributes can be defined for each page. Further, one book may include a plurality of chapters, and one chapter can also include a plurality of pages.

Figure 3A:
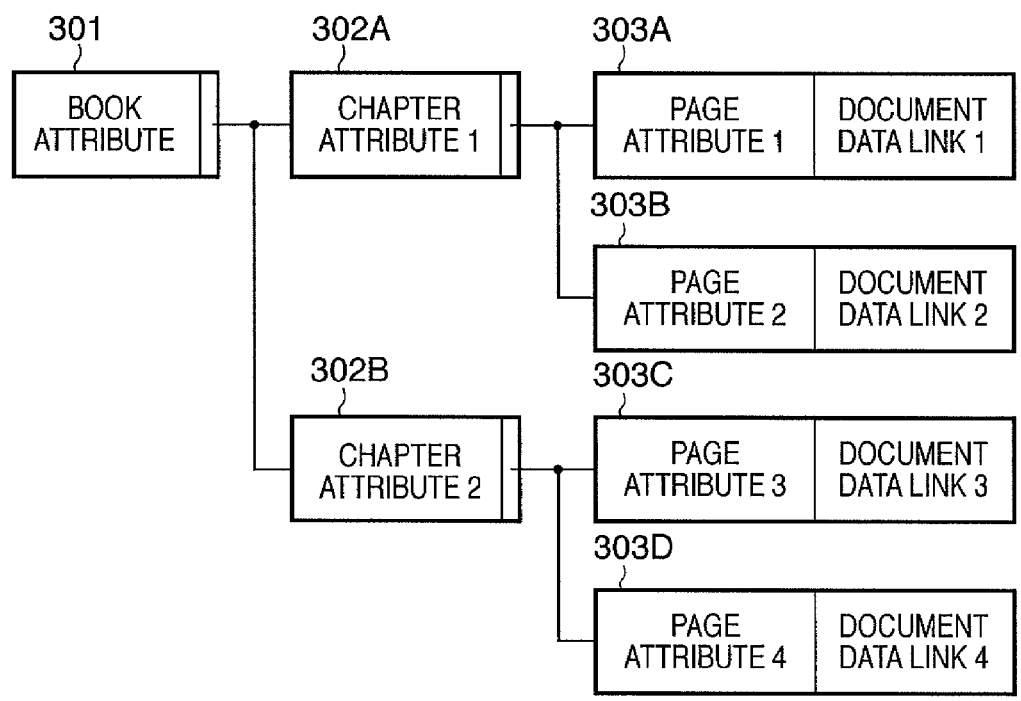
FIGS. 3A and 3B show an exemplary configuration of a book file.
Figure 3B:
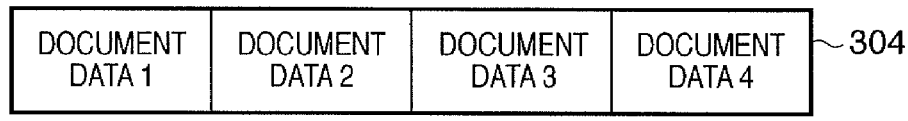

FIG. 3A schematically shows an exemplary format of a book file. In this example, as illustrated in FIG. 3A, the book, chapters and pages in the book file are indicated by respectively corresponding nodes. One book file includes one book. Books and chapters, being concepts for defining the structure as a book, include defined attribute values and links to lower levels as their substance. Pages have the data for each page output by an application program as their substance. Therefore, pages include the substance of document pages (document page data) and links to document page data, in addition to their attribute values. Note that print pages to be output as a print medium or the like may include a plurality of document pages. This structure is indicated as attributes of the different levels of book, chapter and page, rather than by links.

In FIG. 3A, the book attributes are defined in the book 301 and the two chapters 302A and 302B are linked thereto. This link indicates that the chapters 302A and 302B are contained in the book 301. Pages 303A and 303B are linked to the chapter 302A, showing that these pages are included in the chapter 302A. Respective attribute values are defined in the pages 303A and 303B, and links to document page data 1 and 2 forming the substance of these pages are included in the pages 303A and 303B. These links point to the data 1 and 2 of the document page data 304 shown in FIG. 3B, and indicate that the substance of the pages 303A and 303B is the document page data 1 and 2. The user can change the attributes using a user interface provided by the bookbinding application 104.

FIGS. 4A and 4B are a list of book attributes. With regard to items that can also be defined at a lower layer, the attribute value at the lower layer is preferentially employed. Therefore, the defined values of items only included in the book attributes are effective throughout the entire book. However, with regard to items that can also be defined at a lower layer, the book attributes have significance as default values in the case where these items are not defined at the lower level. Note that some of the illustrated items include a plurality of associated items, rather than corresponding specifically to the one item. FIG. 5 is a list of chapter attributes, while FIG. 6 is a list of page attributes. The relation between chapter attributes and page attributes is also similar to the relation between book attributes and lower layer attributes. Note that these attributes are also called print settings.

As evident from FIGS. 4A to 6, the six items Printing Method, Bookbinding Details, Front/Back Cover, Index Sheet, Slip Sheet, and Chaptering are unique to the book attributes. These items are defined throughout the book. As for the Printing Method attribute, the three values Single-sided Printing, Double-sided Printing and Bookbinding Printing can be specified. Here, bookbinding printing is a method that involves printing in a format which enables a book to be bound by folding in two a stack of sheets of a separately specified number, and binding the stack together. As for the Bookbinding Details attribute, the opening direction, the number of sheets in a stack, and the like can be specified if bookbinding printing is set. Further, a "case binding" setting can be saved in the Bookbinding Details attribute. Case binding is a format of bookbinding whereby the front cover is provided separately to the body, and constitutes the front cover, backstrip and back cover. That is, it is bookbinding setting whereby sheets printed with the body portion are cased and bound by a sheet printed with the front cover portion of document data. In the case where a collate setting has been set or a collate setting showing whether to output in collated form when performing case binding has further been set, settings such as an independent front cover setting for printing the front cover separately to the body can be saved. This will be described in detail below with reference to FIGS. 16 and 23.

The Front/Back cover attribute includes a setting for appending a sheet that will form the front and back covers and a setting for specifying the content to print on the appended sheet, when printing an electronic document file to be compiled as a book. The Index Sheet attribute includes a setting for inserting, as chapter breaks, tabbed index sheets provided separately in the printing apparatus, and a setting for specifying the content to print on the index (tab) portion. This attribute is effective in the case where an inserter having an insert function of inserting paper provided separately to the printing paper into a desired position is provided in the printing apparatus being used, or when a plurality of paper feed cassettes are available. This similarly applies to the Slip Sheet attribute.

The Slip Sheet attribute includes a setting for inserting paper to be fed from the inserter or the paper feed cassettes, and a setting for specifying the paper feed source in the case of inserting slip sheets.

The Chaptering attribute includes settings such as whether to use a new sheet, whether to use a new print page or whether to do nothing at a chapter break. This has the same implication as using new paper or a new print page when performing single-sided printing. When performing double-sided printing, consecutive chapters will not be printed on one sheet if "use new paper" is specified, although printing consecutive chapters on the back and front of one sheet is possible if "use new print page" is specified.

All chapter attributes are duplicated with the book attributes, with there being no items unique to the chapters. Consequently, the values defined with the chapter attributes take priority if the definitions in the chapter attributes differ from the definitions in the book attributes. The five items Paper Size, Paper Orientation, Layout (N-up printing) Setting, Scaling and Discharge Method are common to only the book and chapter attributes. Of these, the Layout Setting attribute is for specifying the number of document pages included in one print page. The settable layouts include 1×1, 1×2, 2×2, 3×3, and 4×4. The Discharge Method attribute is for specifying whether to perform a stapling process on discharged paper. The effectiveness of this attribute is dependent on whether the printing apparatus being used has a stapling function.

The items unique to the page attributes include Page Rotation, Zoom, Layout Position, Annotation and Page Partitioning. The Page Rotation attribute is for specifying the rotation angle when placing a document page on a print page. The Zoom attribute if for specifying document page magnification. The magnification is specified with the size of a virtual logical page area as 100%. The virtual logical page area is the area occupied by a single document page in the case where a document page is laid out according to the layout setting or the like. For example, in the case of 1×1, the virtual logical page area is equivalent to a single print page, and in the case of 1×2, the virtual logical page area is an area in which the sides of one print page are reduced to approximately 70%.

The Watermark and Header/Footer attributes are common to the book, chapter and page attributes. Here, a watermark is a separately specified image or character string to print over data created by an application. A header/footer is a watermark printed respectively in the top or bottom margin of the page. Items that can be specified using variables such as page number or date-time are, however, provided in the header/footer. Note that while the content that can be specified in the Watermark attribute and the Header/Footer attribute is common to the chapter and page attributes, this is not the case for the book attributes. The content of watermarks and headers/footers can be set in books, and it is possible to specify how to print watermarks and headers/footers for an entire book. With chapters and pages, on the other hand, it is possible to specify in the chapter or page whether to print a watermark or a header/footer set in the book.

Book-File Generation Procedure

A book file has the foregoing structure and content. Next, a procedure for creating a book file by the bookbinding application 104 and the electronic document writer 102 will be described. The procedure for creating a book file is realized as part of a book file editing operation by the bookbinding application 104.

Figure 7:
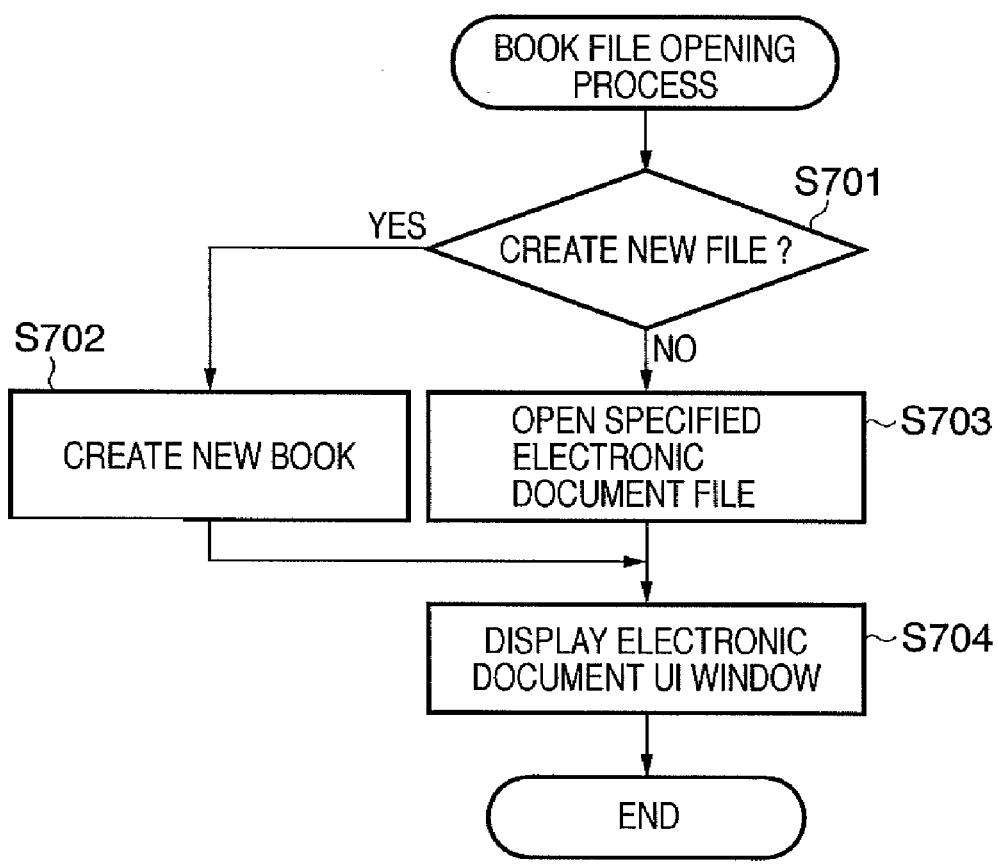
FIG. 7 is a flowchart showing an exemplary procedure for opening a book file.
Figure 11:
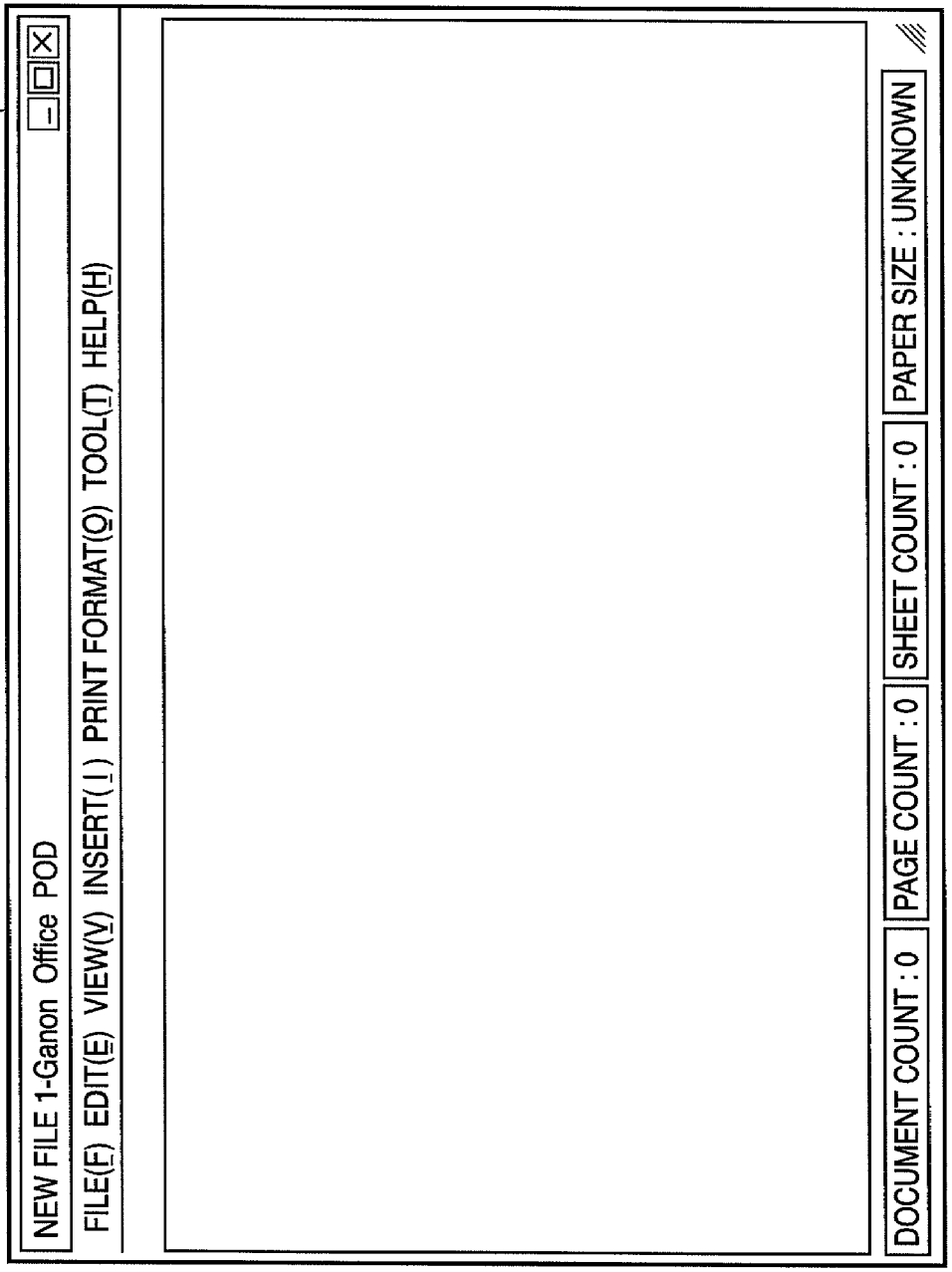
FIG. 11 shows a user interface for when a book file is newly created.

FIG. 7 is a procedure for when opening a book file using the bookbinding application 104. Firstly, it is determined whether the book file to be opened needs to be newly created or already exists (step S701). If it needs to be newly created, a book file without chapters is newly created (step S702). Taking the FIG. 3A example, the newly created book file will only have the book node 301, with no links to chapter nodes. A set of attributes provided in advance for use in new file creation are applied as the book attributes. A user interface (UI) window for editing the new book file is then displayed (step S704). FIG. 11 shows an exemplary UI window for when a book file has been newly created. In this case, nothing is displayed in the UI window 1100, since the book file has no substantive content.

Figure 10:
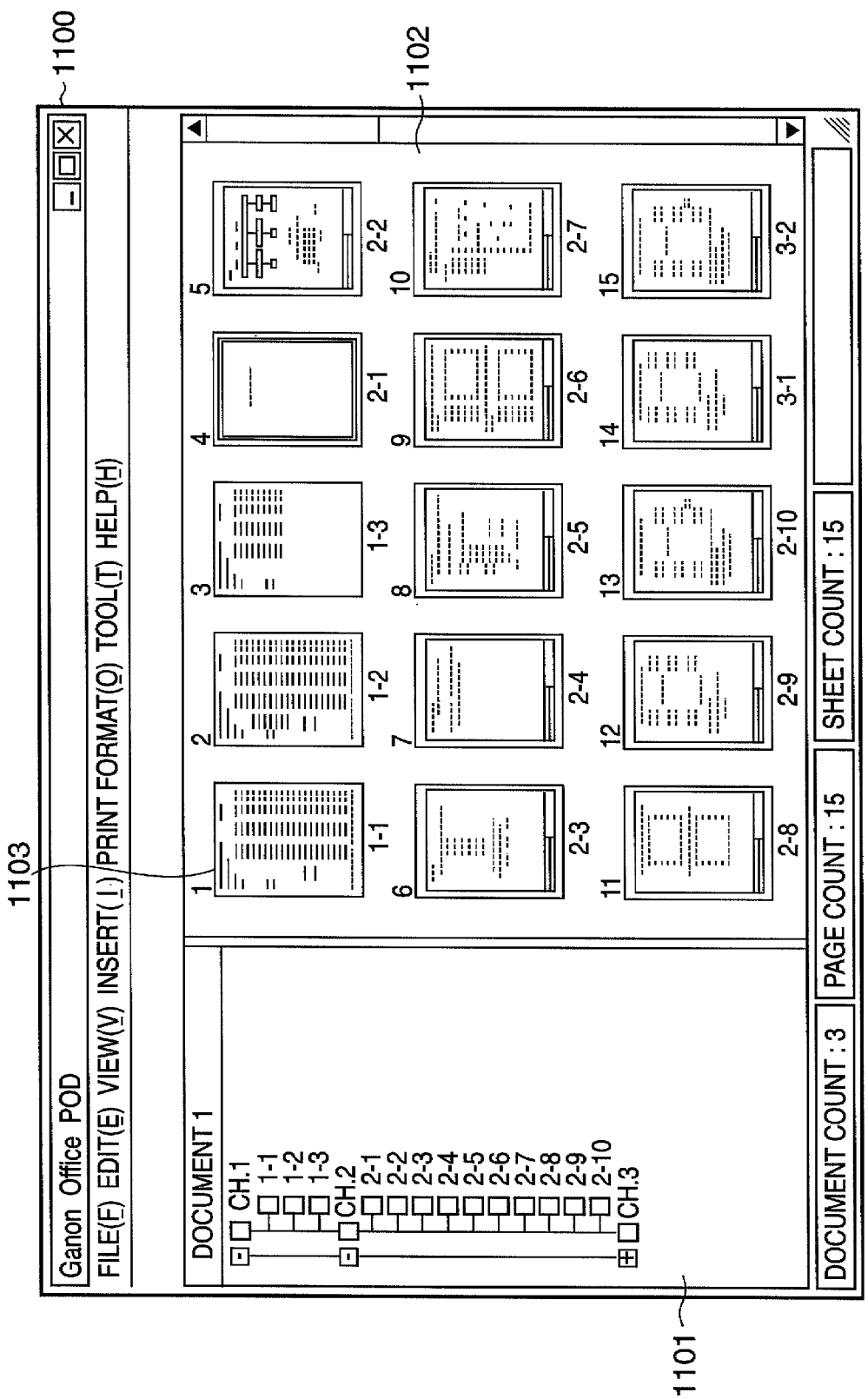
FIG. 10 shows a window showing an exemplary user interface of a bookbinding application.

On the other hand, in the case of an existing book file, the specified book file is opened (step S703), and a user interface (UI) window is displayed in accordance with the structure, attributes and content of the book file. FIG. 10 is an exemplary UI window displaying a book file specified from existing book files. The UI window 1100 includes a tree portion 1101 showing the structure of the book, and a preview portion 1102 displaying the printed state of pages. In the tree portion 1101, chapters included in the book and pages included in the chapters are displayed in a tree structure such as in FIG. 3A. The pages displayed in the tree portion 1101 are document pages. In the preview portion 1102, the content of print pages is displayed as thumbnails. The display order reflects the structure of the book.

Application data converted to an electronic document file by the electronic document writer 102 can be added to the open book file as a new chapter. This is called an electronic document import function. A book file newly created by the procedure shown in FIG. 7 is provided with substance by importing electronic documents to the book file. This function is activated by drag-and-dropping application data to the window in FIG. 10.

Figure 8:
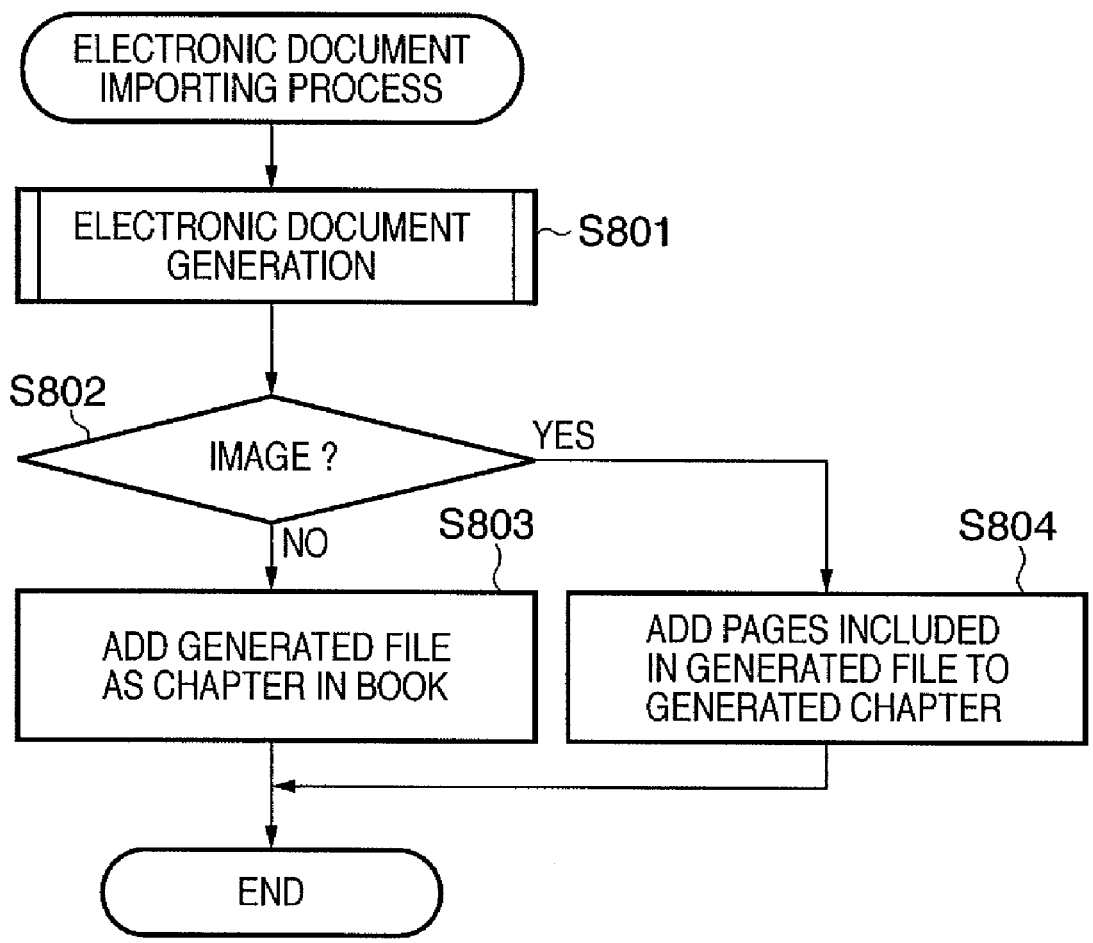
FIG. 8 is a flowchart showing an exemplary procedure for importing an electronic document file to a book file.

The procedure for importing an electronic document is shown FIG. 8. Firstly, the application program that generated specified application data is activated, and the application data is converted to electronic document data by specifying the electronic document writer 102 as the device writer, and printing out the application data (step S801). Electronic document data is generated as a result. Once the application data has been converted, it is determined whether the converted data is image data (step S802). This determination is based on the file extension of the application data in the case of a Windows (registered trademark) OS. For example, it can be determined that the data is Windows (registered trademark) bitmap data if the extension is "bmp", jpeg compressed image data if "jpg", and tiff image data if "tiff". The step S801 processing can also be omitted in the case of image data, since an electronic document file can be generated directly from image data, without activating the application program as in step S801.

Here, if the converted data is not image data, the electronic document file generated at step S801 is added to book of the book file currently opened as a new chapter (step S803). Book attribute values are copied in relation to chapter attributes that are in common with book attributes, while default values provided in advance are set in relation to chapter attributes that are not in common with book attributes. If the converted data is determined at step S802 to be image data, in principle, document pages included in the electronic document file generated at step S801 are added to a specified chapter, without adding a new chapter (step S804). In the case of a newly created book file, however, a new chapter is created, and the pages of the electronic document file are added as pages belonging to this chapter. The values of upper layer attributes are provided in relation to page attributes that are in common with these attributes, while page attributes are provided with the value of attributes defined in the application data in relation to those attributes that are carried on in the electronic document file. For example, if the layout setting is set in the application data, the attribute value of this setting is carried on. In this way, a new book file is created or a new chapter is added.

Figure 9:
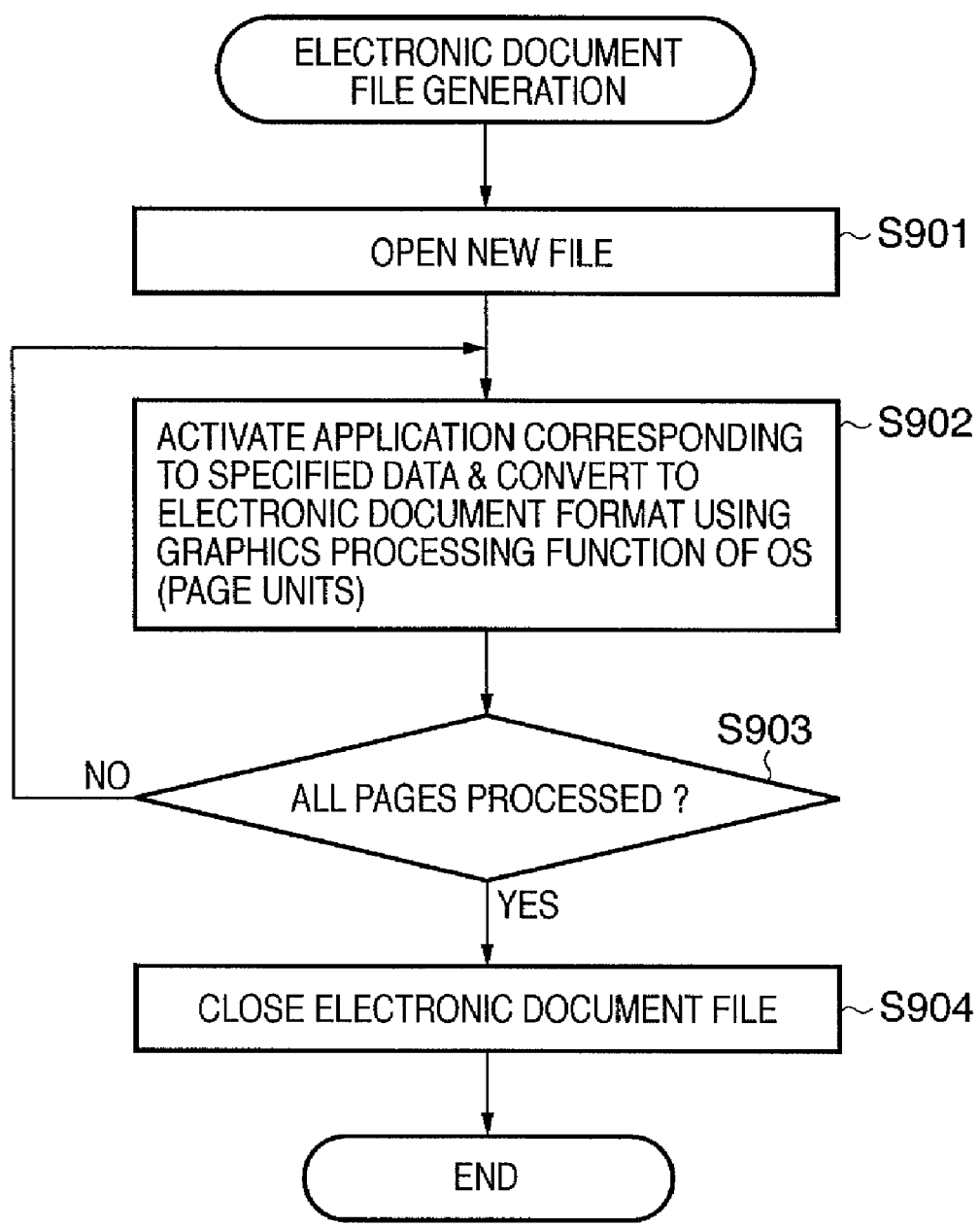
FIG. 9 is a flowchart showing an exemplary procedure for converting application data shown in step S801 of FIG. 8 to an electronic document file.

FIG. 9 is a flowchart showing the procedure for generating an electronic document file by the electronic document writer 102 in step S801 shown of FIG. 8. Firstly, a new electronic document file is created and opened (step S901). The application corresponding to specified application data is activated and made to transmit an output command to an output module of the OS, with the electronic document writer as the device driver. The output module converts the received output command to data in electronic document format and outputs the converted data (step S902). The output destination is the electronic document file opened at step S901. It is determined whether all of the specified data has been converted (step S903), and the electronic document file is closed if all of the data has been converted (step S904). The electronic document file generated by the electronic document writer 102 includes the substance of the document page data shown in FIG. 3B.

Editing a Book File

A book file can be created from application data as described above. The following editing operations are possible on the chapters and pages of a generated book file.

(1) Add New
(2) Delete
(3) Copy
(4) Cut
(5) Paste
(6) Move
(7) Change Chapter Title
(8) Re-assign Page Numbers/Titles
(9) Insert Front cover
(10) Insert Slip sheet
(11) Insert Index Sheet
(12) Paper Layout of Document pages Other operations that can be performed include canceling an editing operation and redoing a cancelled operation. These editing functions enable editing operations such as consolidating a plurality of book files, repositioning chapters and pages within a book file, deleting chapters and pages within a book file, changing the layout of document pages, and inserting slip sheets and index sheets. When these operations are performed, the operation result is reflected and saved in the attributes shown in FIGS. 4A, 4B and 5, or reflected in the structure of the book file. For example, if an operation is performed to newly add a blank page, a blank page is inserted into the specified place. This blank page is treated as a document page. If the layout of a document page is modified, the modified content is reflected in attributes such as Print Method, N-up Printing, Front/Back cover, Index Sheet, Slip Sheet, and Chaptering Separator.

Output of Book File

A book file created or edited as described above, is ultimately intended to be printed out. Here, when the user selects the File menu from the UI window 1100 of the bookbinding application shown in FIG. 10 and selects Print, the book file is printed out by the specified output device. At this time, the bookbinding application 104 creates a job ticket based on the book file currently opened, and passes this job ticket to the electronic document despooler 105. The electronic document despooler 105 converts the job ticket to an output command of the OS, such as a Windows (registered trademark) GDI function, for example, and passes the output command to an output module, such as a GDI, for example. The output module generates a command suitable for the device using a specified printer driver 106, and transits the command to the device.

Here, a job ticket is data having a structure in which the smallest unit is a document page. The structure of the job ticket defines the layout of document pages on paper. One job ticket is issued per job. Therefore, the highest node is a document node, in which the attributes for the entire document such as single-sided/double-sided printing, for example, are defined. Below that are paper nodes, in which attributes such as the identifiers of paper to use and the specification of paper feed ports in the printer are included. Below each paper node is the node of a sheet to be printed with the paper of the paper node. One sheet is equivalent to one piece of paper. One or more print pages (physical pages) belong to each sheet. One physical page (also called a side) belongs to one sheet in the case of single-sided printing, and two physical pages belong to one sheet in the case of double-sided printing. A document page to lay out on a physical page belongs to that physical page. The layout of the document pages is included as an attribute of the physical pages. The electronic document despooler 105 converts the job ticket to an output command to the output module.

Other System Configurations

Figure 12:
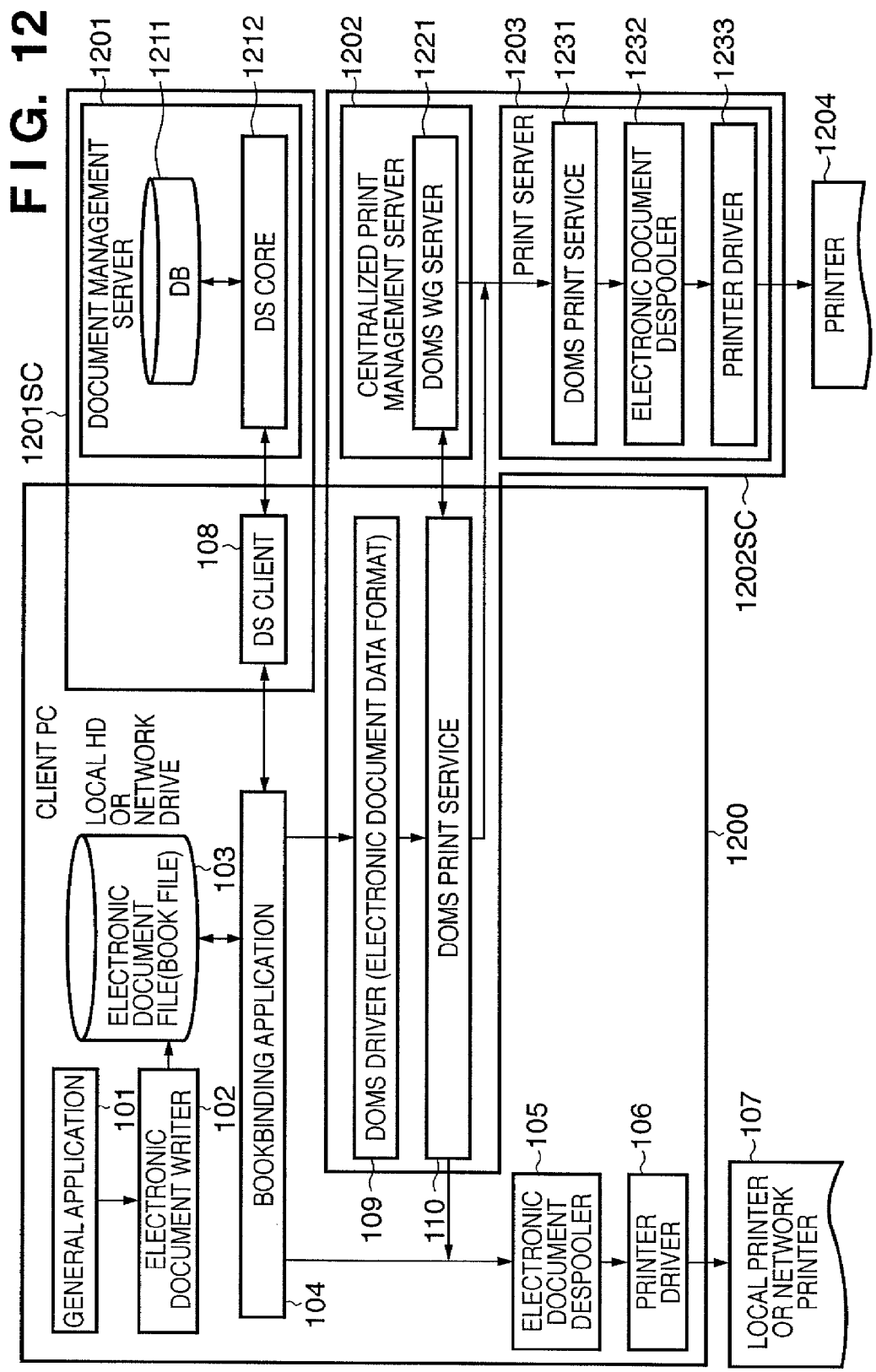
FIG. 12 is a block diagram showing an exemplary software configuration of a client-server document-processing system.

An overview of the document-processing system of the preset embodiment is as described above. This is a standalone system, although even with a client-server system that extends this system, book files can be created and edited with a substantially similar configuration and procedures. The book files and printing process are, however, managed by a server. FIG. 12 is a block diagram showing the configuration of a client-server document-processing system. The client-server document-processing system has a configuration in which the client modules DOMS driver 109 and DOMS print service module 110, and a document service (DS) client module 108 have been added to the standalone system. DOMS, which stands for Document Output Management Service, is a service for managing document output. A document management server 1201, a centralized printing management server 1202, and a print server 1203 are connected to this client-server document-processing system 1200. These servers are connected to the client-server document-processing system by a standard network, although if any of the servers function at the same time as a client, those servers will be connected by inter-process communication which simulates communication with a network.

Note that while both the document management server 1201 and the centralized printing management server 1202 are connected to the client in the example shown in FIG. 12, the case where only one of these servers exists on the network is also possible. For example, assume that the document management server is the connected server, and that a document management client-server system 1201SC that includes the client module 108 is the centralized printing management server 1202. In this case, a print management client-server system 1202SC that includes the client modules is added to the standalone document management system. The document management server 1201 stores book files created and/or edited by the bookbinding application 104. In the case where book files are managed by the document management server 1201, the book files are saved to a database 1211 of the document management server 1201 instead of or in addition to the local HD of the client PC. The saving and reading of book files between the bookbinding application 104 and the document management server 1201 is performed via the DS client module 108 and a DS core 1212.

The centralized print management server 1202 manages the printing of book files stored in the client-server document-processing system 1200 or the document management server 1201. A print request from the client is transmitted to a DOMS workgroup (WG) server module 1221 of the centralized print management server 1202 via the DOMS driver 109 and the DOMS print service module 110. The centralized print management server 1202 passes the electronic document data to the electronic document despooler 105 via the DOMS print service module 110 of the client. If printing is to be performed by the print server 1203, the print request is transmitted to a DOMS print service module 1231 of the print server 1203. The centralized print management server performs a security check on the eligibility of users that issue print requests in relation to saved book files, and saves the print log, for example. The document-processing system can thus be realized as a standalone system or a client-server system.

Preview Display of Content

As described above, the UI window 1100 shown in FIG. 10 is displayed when a book file is opened by the bookbinding application. A tree showing the structure of the open book (hereinafter, called the "target book") is displayed in the tree portion 1101. Three display methods are provided in the preview portion, depending on a user specification. The first method is a mode called document view in which document pages are displayed directly. In document view mode, the content of document pages belonging to the target book is displayed as thumbnails. Note that the layout is not reflected in the display in the preview portion 1102. The second method is print view mode. In print view mode, document pages are displayed in a form in which the layout of the document pages is reflected in the preview portion 1102. The third method is simple print view mode. In simple print view mode, only the layout of document pages is reflected in the display in the preview portion, and not the content.

Staple Control

Figure 13:
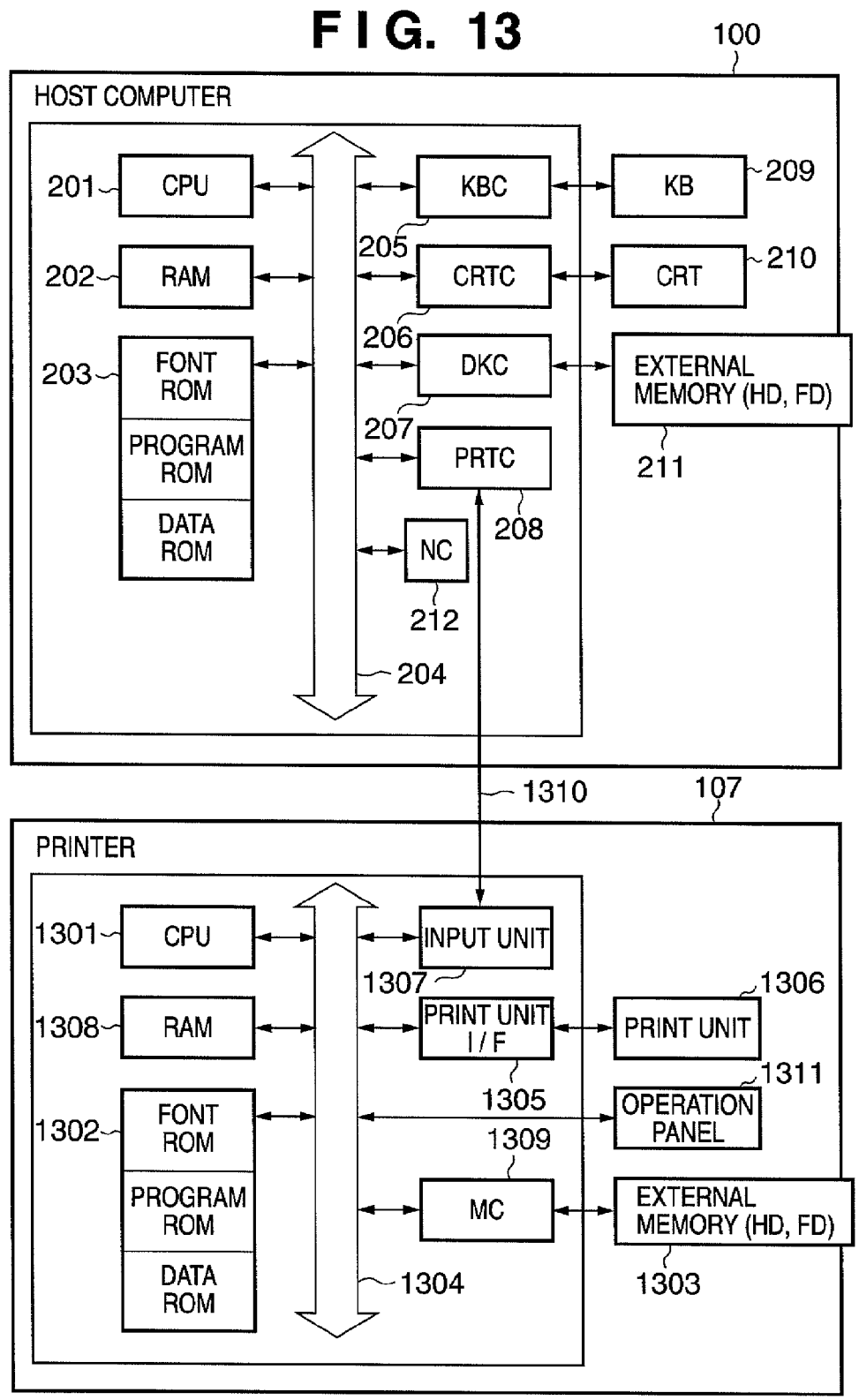
FIG. 13 is a block diagram showing the configuration of a staple control system.

Next, post-processing control such as stapling performed by the bookbinding application 104 of the computer 100 connected to a printer having post-processing functions such as stapling and bookbinding function will be described. FIG. 13 is a block diagram showing the configuration of staple control system. As shown in FIG. 13, the post-processing control system is constituted by the host computer 100 shown in FIG. 2 and the printer 107 having post-processing functions. Hereinafter, the configuration of the printer 107 will be described. Note that provided the functions of the present invention are realized, the present invention can be applied even with a standalone device, a system composed of a plurality of devices, or a system in which processing is performed with connection via a LAN, WAN or similar network.

As shown in FIG. 13, a printer CPU 1301 in the printer 107 executes control programs and the like stored in a program ROM of a RON 1302 or in an external memory 1303. Image signals are thus output as output information to a print unit (printer engine) 1306 via a print unit I/F 1305 connected to a system bus 1304. Control programs and the like of the CPU 1301 are stored in the program ROM of the ROM 1302, and font data and the like used when generating output information is stored in a font ROM of the ROM 1302. Information and the like used by the host computer 100 is stored in a data ROM of the ROM 1302 in the case of a printer without an external memory 1303 such as a hard disk. The CPU 1301 can communicate with the host computer 100 via an input unit 1307, and is able to notify information and the like to the host computer 100. The RAM 1308 functions as a work area and a main memory of the CPU 1301, and memory capacity can be extended using an option RAM connected to an extension port (not shown). Note that the RAN 1308 is used as an output information decompression area, an environment data storage area, an NVRAM and the like. Access to the aforementioned hard disk (HD) and an external memory 1303 such as an IC card is controlled by a memory controller (MC) 1309. The external memory 1303 is connected as an option, and stores font data, emulation programs, form data, and the like. An operation panel 1311 is constituted by switches for operating, an LED display unit and the like. A plurality of external memories 1303 may be provided rather than being limited to one, and the printer 107 configured so that a plurality of external memories storing programs for interpreting printer control languages of differing language systems and option cards in addition to the built-in fonts can be connected. Further, the printer 107 may include an NVRAM (not shown), and store printer mode setting information from the operation panel 1311.

In the present embodiment, an off-line bookbinding device (not shown) is used, apart from the printer 107 and the host computer 100. The off-line bookbinding device has a tray (also called "paper feed port") for setting the front cover and a tray for setting the collated copies of the body. Bookbinding parameters that have been separately input, such as the size of the front cover, the number of sheets per copy, and the number of copies to be bound, are saved. The bookbinding device then stacks the body per copy and fixes the front cover to the backstrip of the body with glue or the like, in accordance with the saved bookbinding parameters. The user thus needs to place the collated copies constituting the body portion of the printed document output from the printer on a tray for the body in the bookbinding device, and place the front cover portion on a tray for the front cover.

Variable Printing

Figure 14:
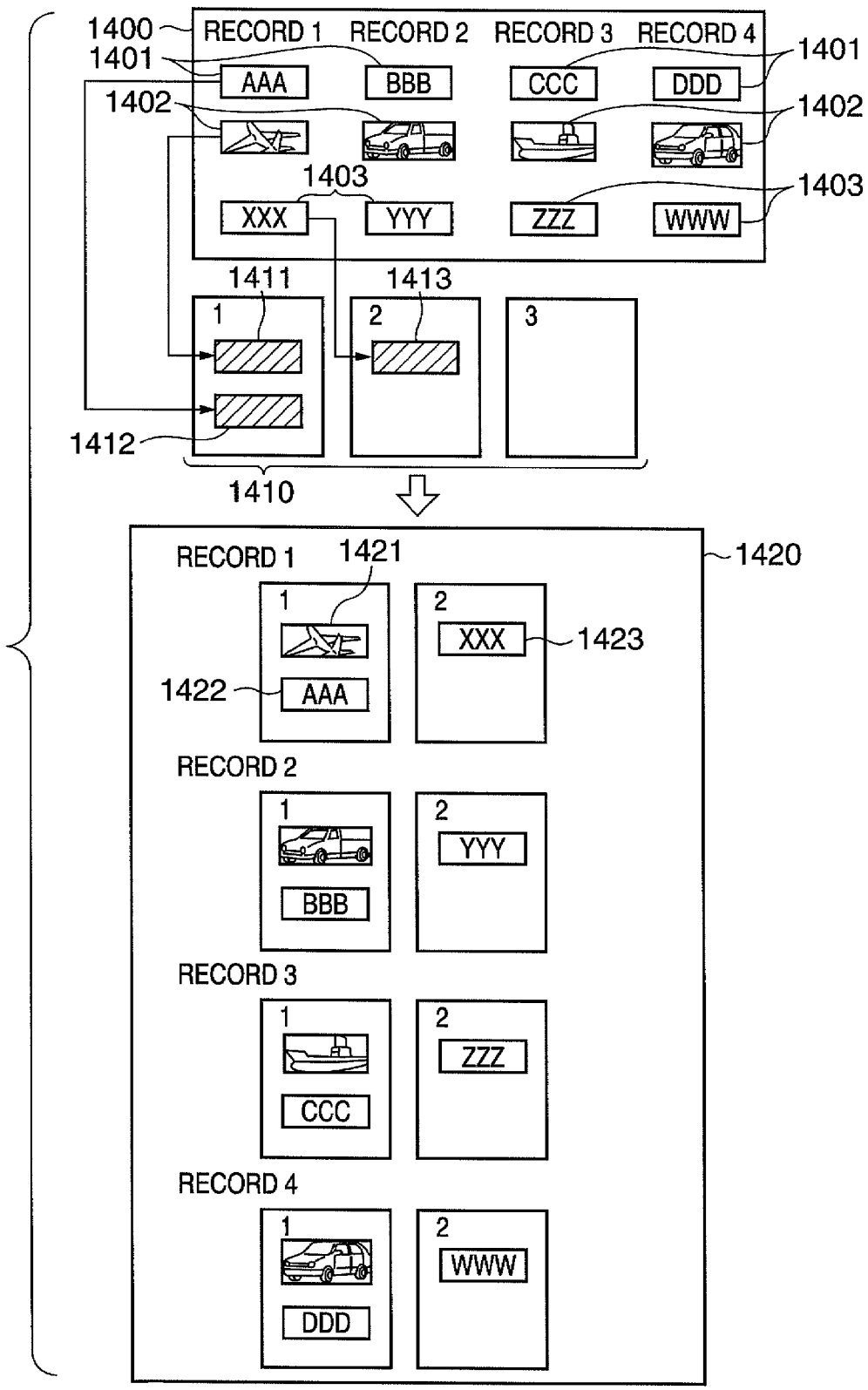
FIG. 14 illustrates variable printing.

The bookbinding application is able to set variable fields for executing variable printing, as a page attribute of a generated book file. FIG. 14 shows an exemplary page layout of variable printing. A document in which variable fields are defined is called a template. Variable fields 1411, 1412 and 1413 for executing variable printing are defined on a template 1410. A document page can be laid out with a plurality of variable fields or no variable fields. In the FIG. 14 example, two variable fields are laid out on the first page and one on the second page, while none are provided on the third page. The bookbinding application 104 inserts data read from a database into the variable fields on the page, customizing each copy to print. A variable field is therefore an area for inserting variable data. A database 1400 is an exemplary database in which variable data is registered. The database 1400 is constituted by records, each of which corresponds to one copy of a document to output. A record includes data fields that are equivalent to the variable fields provided on the template, and that are inserted into corresponding variable fields. In this example, the data of the four records 1 to 4 is set in the database 1400. That is, there are four copies of the printed document to output. Each record in the database 1400 includes text data 1401 and 1403 and image data 1402 as variable data. The two variable fields 1411 and 1412 are defined on the first page of the template, and the variable field 1413 is defined on the second page. Settings have been made such that text data is inserted into the variable fields 1412 and 1413, and image data is inserted into the variable field 1411. Output 1420 shows an exemplary template in which data from the database has actually been inserted. Image data 1421 read from the record 1 is inserted into the variable field 1411 of the first page, and text data 1422 is inserted into the variable field 1412. Text data 1423 is inserted is inserted into the variable field 1413 of the second page. While the third page is omitted, an output document (first copy) corresponding to the record 1 is generated with these three pages.

A second copy of the document in which the record 2 is inserted into the variable fields, a third copy of the document in which the record 3 is inserted into the variable fields, and a fourth copy of the document in which the record 4 is inserted into the variable fields are similarly generated.

Note that the template can be set by a variable printing editor. This variable printing editor is activated by the bookbinding application, and can perform setting in the logical page units of a book file. The variable printing editor is able to create the fixed data (text, images) and variable fields (also called variable areas) in the template. The variable printing editor is also able to define the association between variable fields and data (fields) in the records of the database.

Bookbinding Printing Process

Figure 20:
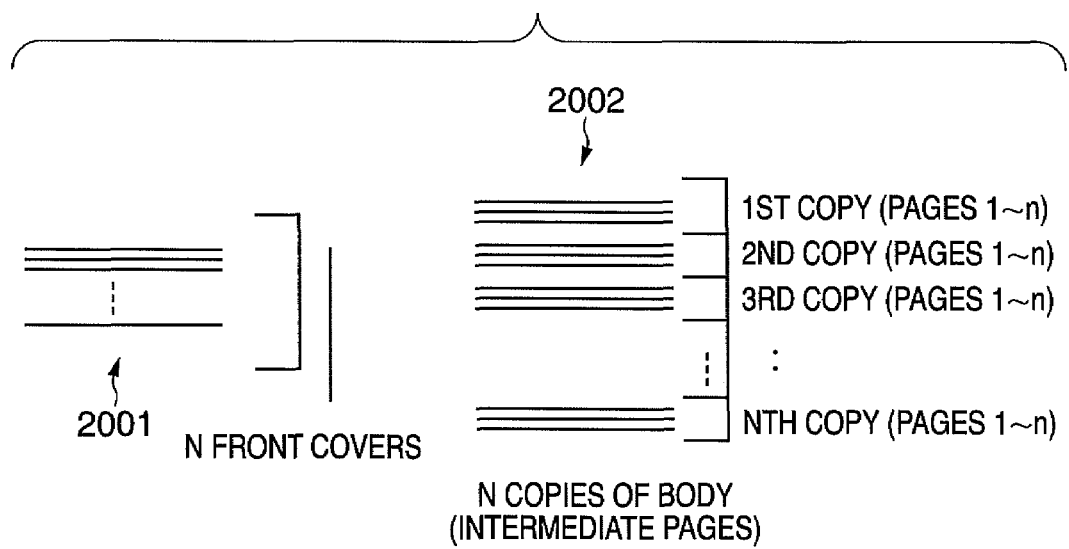
FIG. 20 illustrates inputs for case binding.
Figure 21:
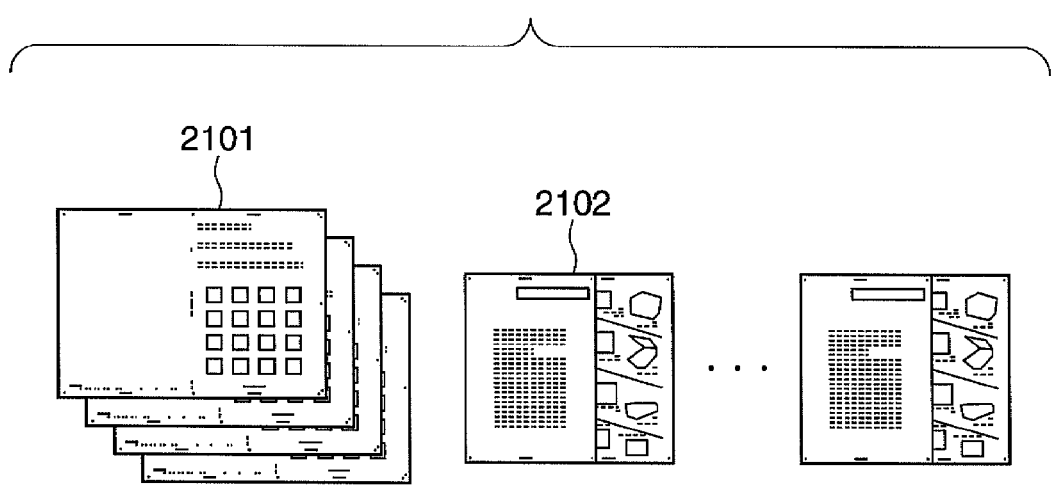
FIG. 21 illustrates a printing result.
Figure 22:
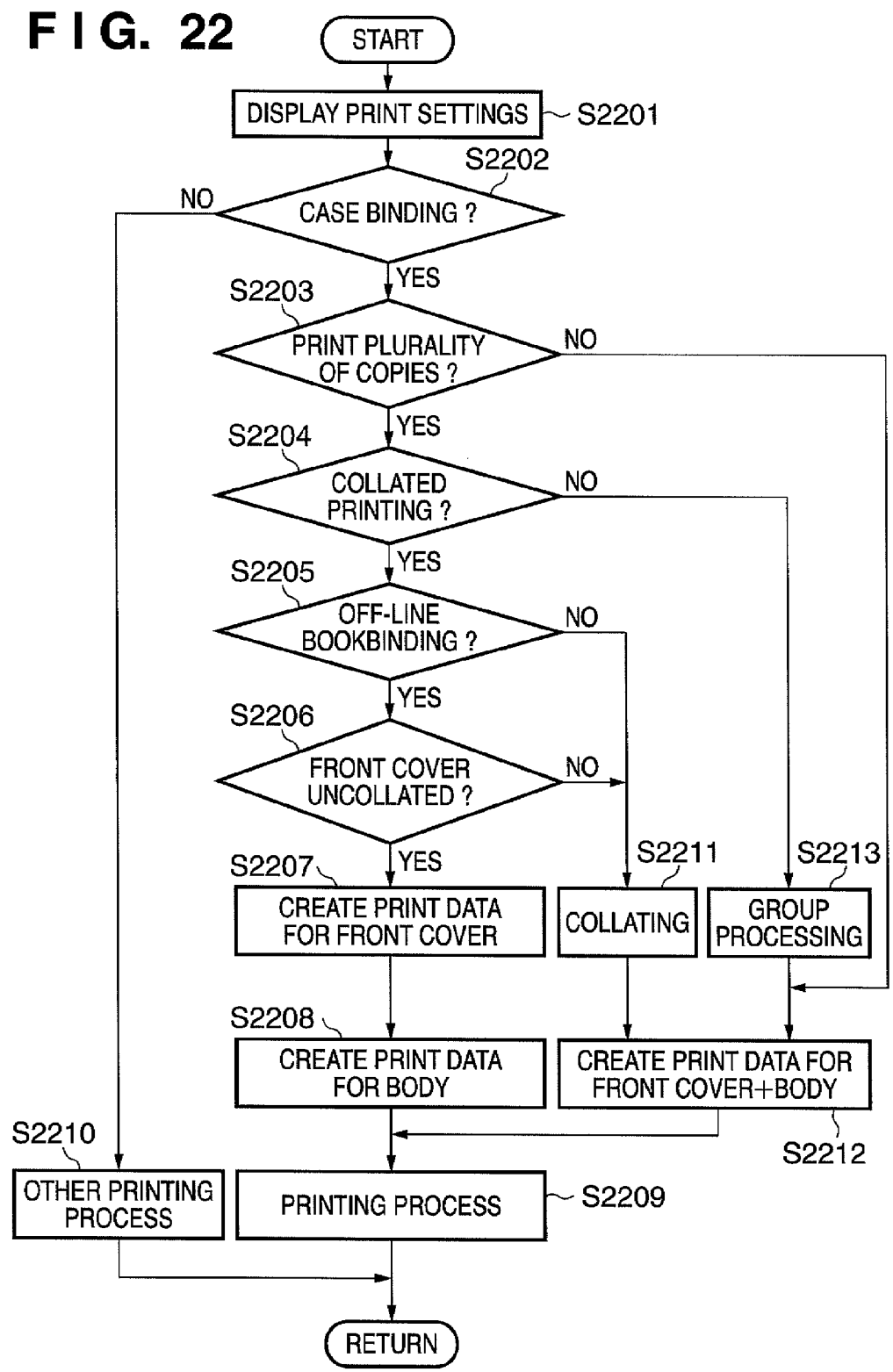
FIG. 22 is a flowchart of a portion of a method used in the preferred embodiments.

FIGS. 15 to 23 show exemplary interfaces and the like for illustrating the bookbinding application in the present embodiment. FIG. 22 shows a flowchart of output processing by the bookbinding application in the present embodiment. The processing flow of the present embodiment will be described using these diagrams.

Figure 15:
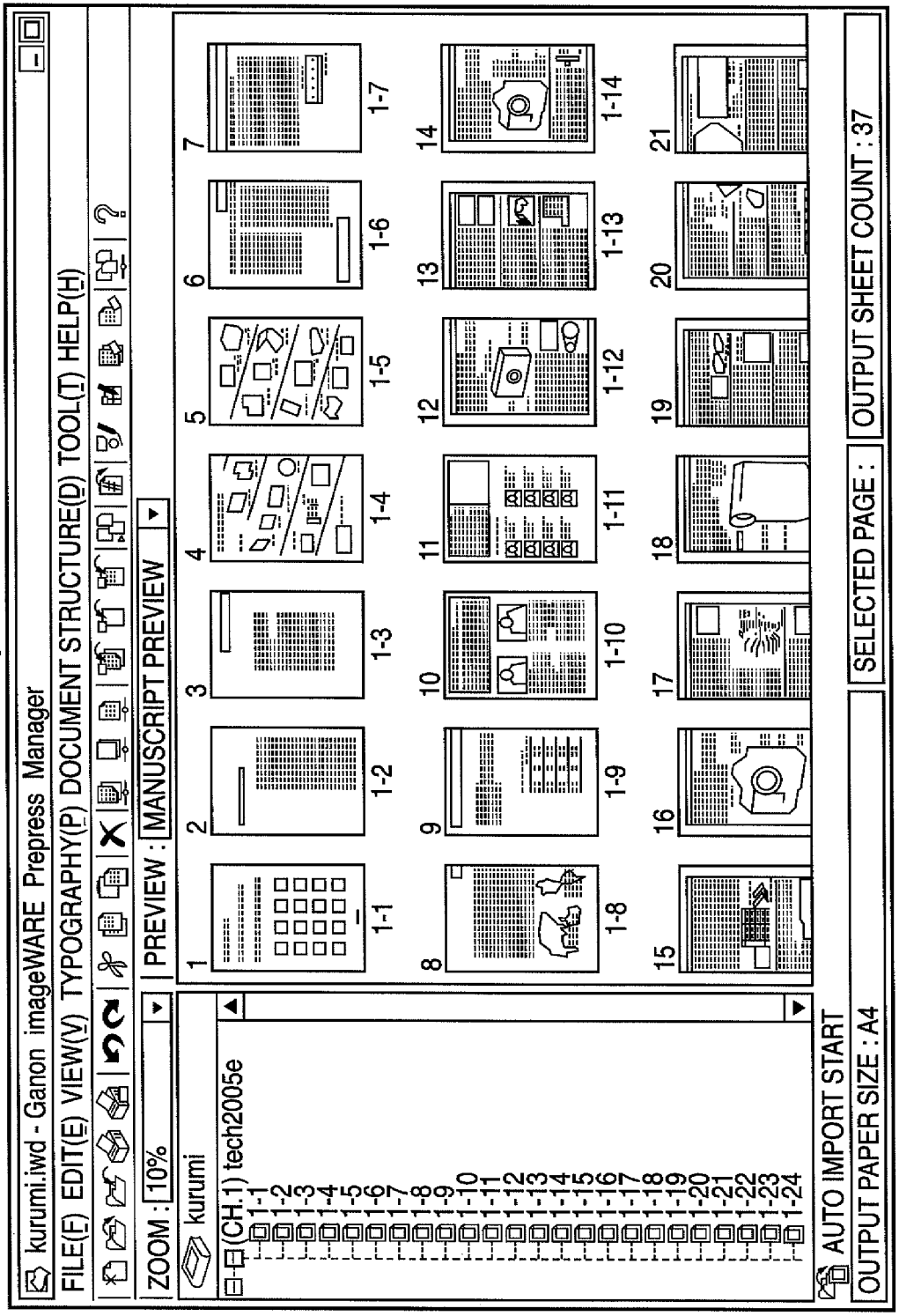
FIG. 15 illustrates a window showing an exemplary user interface of a bookbinding application.
Figure 16:
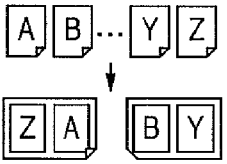
FIG. 16 illustrates a window showing an exemplary user interface of a bookbinding application.

FIG. 15 shows an exemplary display of a user interface 1501 for when front cover data and body data have been imported to the bookbinding application 104. The pages of the read document are displayed on the user interface. The front cover data and the body data are converted to electronic document format by optically scanning a paper document, for example. FIG. 16 illustrates a setting user interface for setting case binding as part of the print settings. Here, the bookbinding method is set to "Case Binding", the opening direction is set to "Open from right to left", the front cover paper size is set to "A3" (body output size is A4), the front cover allocation of logical page data is "Front(2)/Back(2)". Here, the front cover allocation of logical pages is a setting that defines how to allocate imported page data to the front cover. "Front(2)/Back (2)" is a setting whereby the first page A and the next page B as well as the second-to-last page Y and the last page Z out of the pages to print are laid out on the front cover. In the present example, the last page Z and the first page A are laid out on the front of the casing-in front cover, and the second page B and the second-to-last page Y are laid out on the back. If a corresponding page does not exist, the area in which that page would have been laid out is left blank. A book that is consecutive from the first page to the last page is formed by fixing the middle of the front cover sheet printed with these pages to the backstrip of the stack of body sheets printed with the other pages.

Figure 17:
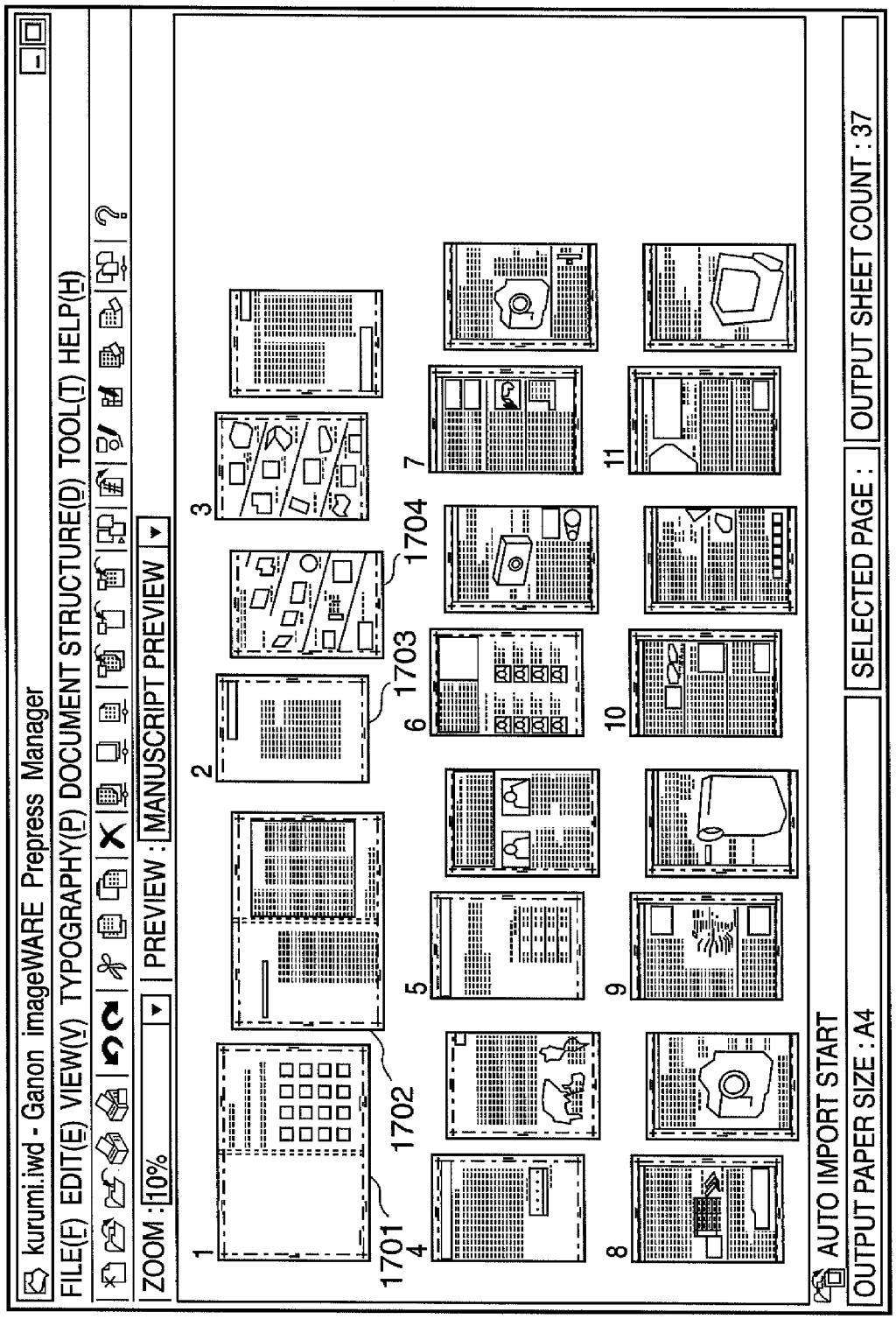
FIG. 17 illustrates a window showing an exemplary user interface of a bookbinding application.

FIG. 17 illustrates a display of a view (paper preview) of what the printed sheets will actually look like as a result of the above settings. In this way, logical pages are respectively allocated to the body sheets (A4) and the front cover sheet (A3) which is twice the size of the body sheets, and the result of outputting the front cover and the body is previewed as shown in FIG. 17. The following description assumes that setting such as these have been made. In FIG. 17, the front 1701 and back 1702 of the front cover are shown at a size twice that of the other pages. The first page shown in FIG. 15 is laid out on the right side of the front 1701 of the front cover, and the last page (not shown in FIG. 15) is laid out on the left side. The second-to-last page (not shown in FIG. 15) is laid out on the right side of the back 1702 of the front cover, and the second page shown in FIG. 15 is laid out on the left side. Also, the third page, for example, is laid out on the front 1703 of the first sheet (sheet no. 2) of the body, and the fourth page is laid out on the back 1704. This is similarly repeated until the end of the body.

Processing Flow

Figure 23:
FIG. 23 shows an exemplary user interface characterizing the invention according to preferred embodiments.

In printing of a previewed document constituted by a plurality of pages such as in FIG. 17 with the bookbinding application 104 that is desired by the user, the user selects the Print control from the File menu. When a print instruction is input as a result, the procedure shown in FIG. 22 is executed by the bookbinding application 104. Firstly, a print settings display process S2201 is performed. This process involves the bookbinding application 104 displaying a Print Settings dialog box 2300 such as shown in FIG. 23. Here, the user selects the printer (printing apparatus), and sets the number of copies, the print range, and so on. Settings that can be changed include Collate 2301, Do Not Collate Front Cover 2302, and Print Range 2303. If Collate 2301 is set, print data for printing collated copies of a printed document is generated, and transmitted to the printing apparatus. If Do Not Collate Front Cover 2302 is set, the front cover is excluded from the collated copies, which are constituted by the body only, and print data for printing a specified number of uncollated copies of the front cover is generated and transmitted. That is, the print data is created with separate settings (uncollated, collated) for the front cover and the body. With Print Range 2303, the range of pages to print from the document data is specified.

After setting desired bookbinding settings, the user clicks the OK button to instruct the start of print data generation. This triggers a process S2202 for determining whether case-binding printing has been specified, with reference to the bookbinding settings in the saved print settings. If it is determined that case-binding printing is set, a process S2203 is performed next to determine whether printing of a plurality of copies is set. If the set number of copies is two or more, it can be determined that printing of a plurality of copies is set. If it is determined that printing of a plurality of copies is set, a process S2204 is performed next to determine whether printing of collated plurality is set. Collated printing is a printing method that results in each of the plurality of copies being output in page order (i.e., 1 2 3 . . . , 1 2 3 . . . , etc.). When Collate 2301 in FIG. 23 is checked, collated printing is set in the print settings. Note that in contrast to collated printing is a printing method generally called uncollated printing or group printing whereby a specified number of copies of each page are printed together (i.e., 1 1 1 . . . , 2 2 2 . . . , etc.). If collated printing is specified, a process S2205 is performed to determine whether bookbinding is off-line. Off-line bookbinding, as described above, indicates a mode of printing in which the printing device and the bookbinding device are not directly connected. With the bookbinding application 104, the Finisher control "None" in the exemplary user interface shown in FIG. 16 shows this. That is, whether printing is off-line can be determined by checking this item in the print settings. In FIG. 16, "Paste front cover & trim" (on-line printing) is shown as an example, but when "None" is selected in the Finisher control, it is determined that bookbinding is off-line, and a process S2206 is performed to determine whether to print the front cover in uncollated form.

Figure 18:
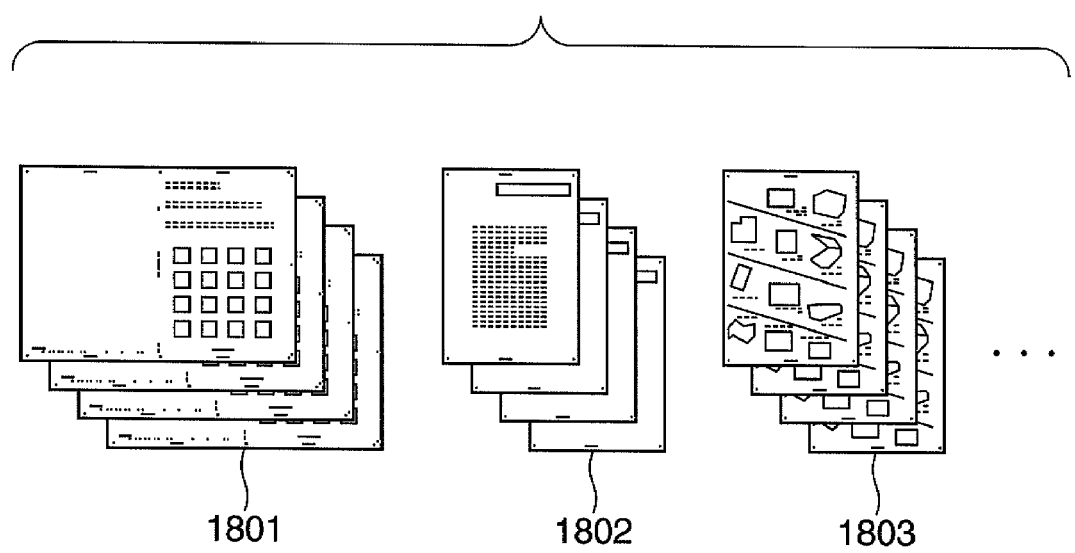
FIG. 18 illustrates an example of N copies of documents when the print settings have not been set to perform printing of collated copies.
Figure 19:
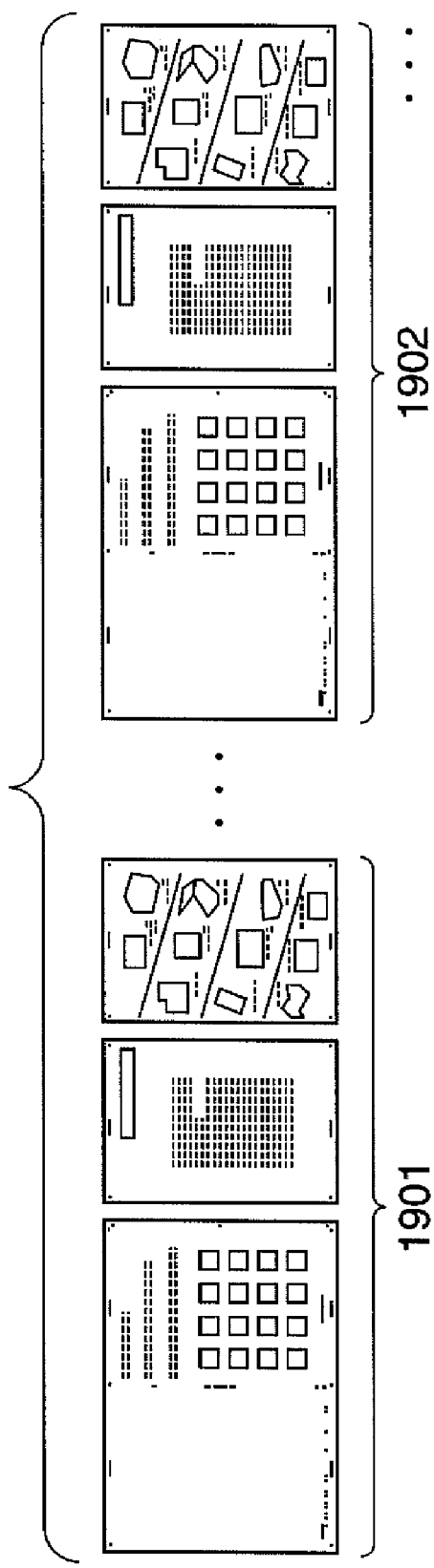
FIG. 19 illustrates a printing result.

If the print settings have been set to perform all case binding printing including the front cover in collated form, collated printing that includes the front cover will be performed, and a printing result such as in FIG. 19 will be obtained. That is, a first copy 1901, a second copy 1902 and so on will be sequentially printed as collated copies that contain both the front cover and the body. On the other hand, if the print settings have not been set to perform printing of collated copies, this will result in N copies of the front cover, and N copies of each page being printed in turn, such as 1 1 1 . . . , 2 2 2 . . . , and so on, such has shown in FIG. 18.

With a case binding device that inputs (feeds) the printed front cover and body using separate paper feed ports, a printing result in which the N sheets of the front cover are separated from the N copies of the body is preferable. This is illustrated in FIG. 20, and the printing result is illustrated in FIG. 21. That is, in the case where a case binding device that inputs (feeds) the printed front cover and body using separate paper feed ports is used, the burden on the operator can be reduced by printing the front cover in uncollated form and the body in collated form. The reason being that the operator responsible for the bookbinding process need only put the N sheets of the front cover in the paper feed port used for the front cover and the N copies of the body in the paper feed port used for the body. Here, the problems that arise in the case of printing results such as in FIGS. 18 and 19 will be described.

Firstly, if bookbinding is performed on a printing result such as in FIG. 18 using a case binding device that feeds the front cover and the body using separate paper feed ports, the operator needs to separate the front cover and the body portion, and then arrange the printed document one sheet at a time from the sets of pages. That is, a process whereby the operator takes one sheet from the set 1802 of first pages of the body and one sheet from the set 1803 of second pages of the body is repeated for all of the pages, until the 1-th to n-th (n being the last page of the body) pages have been arranged. This process needs to be repeated for N copies (N being the specified number of copies), increasing the burden on the operator.

On the other hand, if bookbinding is performed on a printing result such as in FIG. 19 using a case binding device that feeds the front cover and the body using separate paper feed ports, the operator needs to remove the front cover from each copy, with the burden of the operator increasing the greater the specified number of copies.

Therefore, if printing of the front cover in uncollated form such as in FIG. 21 is desired after taking into consideration the bookbinding process, the user selects "Do not collate front cover" as in the exemplary UI shown in FIG. 23. Then, in the process S2206 for determining whether to print the front cover in uncollated form, it is determined that "Do not collate front cover" (i.e., front cover not printed in collated form) is set, with reference to the print settings. In this case, the next process S2207 is performed to create print data for the front cover. This process involves creating the print data of the front cover portion created by the bookbinding application. Here, as shown above, the bookbinding application 104 creates data that allocates a pair of logical pages (Z, A) for the front of the front cover and a pair of logical pages (B, Y) for the back of the front cover to a front cover sheet of specified size. Note that the question of whether to generate this front cover data for one sheet or for the number of copies to print depends on the capacity of the printing apparatus. If the printing apparatus is provided with storage for saving print data, and is able to print the specified number of copies using print data stored in the storage, generating front cover data for one sheet is sufficient. If the printing apparatus is unable to print the specified number of copies, the front cover data is either repeatedly generated for the specified number of copies, or at least repeatedly transmitted to the printing apparatus for the specified number of copies.

Note that although it is determined at step S2206 whether "Do not collate front cover" is set, with reference to the print settings, the bookbinding application 104 may determine whether to print the front cover in uncollated form, based on the function information of the bookbinding device that executes the bookbinding process. Note that if the bookbinding apparatus is near-line, the function information of the bookbinding apparatus is acquired by communication, whereas if the bookbinding apparatus is off-line, the function information is acquired by user registration. For example, if the bookbinding apparatus is provided with a function of feeding the printed front cover and body using separate paper feed ports, the bookbinding application 104 determines that the front cover is to be output in uncollated form. On the other hand, if the bookbinding apparatus is provided with a function of feeding the printed front cover and body using the same paper feed port, the bookbinding application 104 determines that the front cover and body are to be output in collated form.

Next, a process S2208 is performed to create print data for the body. This process involves creating the body data in page order (i.e., 1 2 3 . . . , etc.), following the front cover. Here, as shown above, the bookbinding application 104 creates the print data of the body, other than the data for the front (Z, A) and back (B, Y) of the front cover. Similarly to the front cover, the question of whether to create body data for one copy or for the specified number of copies, excluding the logical pages to lay out on the front cover, depends on the capacity of the printing apparatus.

A printing process S2209 is then performed. This process involves transmitting the created print data for the front cover and the body to the printing apparatus. Therefore, the print data for the front cover generated by the bookbinding application 104 and a command specifying the number of copies are issued to the printing apparatus. The print data for the body generated by the bookbinding application 104 and a command specifying the number of copies and instructing collated printing are also issued to the printing apparatus. If the printing apparatus is unable to issue the collate command in the middle of a print job, the print job is divided into front cover and body. These commands are processed by the printing apparatus or the printer driver.

At the process S2207 for creating print data for the front cover and the process S2208 for creating print data for the body, it is also possible to create and transmit print data for the plurality of copies. This is performed if the printing apparatus or the printer driver does not have a collate command or has a collate command but is unable to switch to collate in the middle of a print job, or if the user does not want to divide the print job into a plurality of print jobs. The printing result shown in FIG. 21 can thus be obtained.

If it is determined in step S2203 that printing of a plurality of copies is not set, the processing branches to step S2212, where the bookbinding application 104 generates print data equivalent to one copy each of the front cover portion and the body portion. If it is determined in step S2204 that collated printing is not set, the processing branches to step S2213, where the bookbinding application 104 generates print data in an uncollated form for both the front cover and the body. That is, the bookbinding application 104 generates print data for N sheets of the front cover, and print data for N sheets of the first page, N sheets of the second page, and so on, in relation to the specified number of copies (N copies). This is called group processing. If it is determined at step S2205 that bookbinding is not off-line, or it is determined at step S2206 to also collate the front cover, the bookbinding application 104 generates print data for printing the front cover and the body together in collated form (step S2211). That is, the bookbinding application 104 creates print data composed of the front cover, first page, second page, and so on for the specified number of copies (N copies). This is called collating.

As described above, the present embodiment enables the body portion and the front cover portion to be generated separately if case binding is set as part of the print settings. Specifically, the present embodiment enables print data to be generated with the front cover uncollated and the body collated. Here, print data does not merely show the content to print but includes commands specifying to the printer driver or the printing apparatus whether collated or uncollated printing is set in the print settings. Then, in accordance with an instruction from the bookbinding application, the printer driver generates a print job that includes print data for the front cover and print data for the body.

Thus, if case binding is performed using an off-line bookbinding device, the operator is able to start the bookbinding operation by setting a stack of collated sheets for the body in the body tray and a stack of uncollated sheets for the front cover in the front cover tray. As a result, the work for the operator can be reduced. Note that in the case where a bookbinding device that operates as an apparatus external to the printing apparatus is used, the effects of the present invention can be obtained by applying the invention, without being limited to an off-line bookbinding device. For example, the bookbinding device can communicate with the printing apparatus via a network, although the present invention can also be applied to a near-line bookbinding device whose paper transport path is not connected to the printing apparatus.

Second Embodiment

In the second embodiment, if case binding is performed on a plurality of records of a document printed with variable printing in which variable data is defined, for example, it is preferable to output the front covers for the plurality of records together, similarly to the first embodiment. This is because for each record in variable printing, one document having the variable data of that record inserted into a variable field is printed. Since printing a document inserted with a plurality of records is similar to printing a plurality of copies except that the data is variable, the invention of the first embodiment can also be applied to variable printing. This processing flow will be described using FIG. 24.

Assume that the importing of the data shown in FIG. 15, the setting of case binding shown in FIG. 16, and the setting of fields in variable printing shown above have been performed for pages allocated to the front cover, similarly to the first embodiment.

Figure 24:
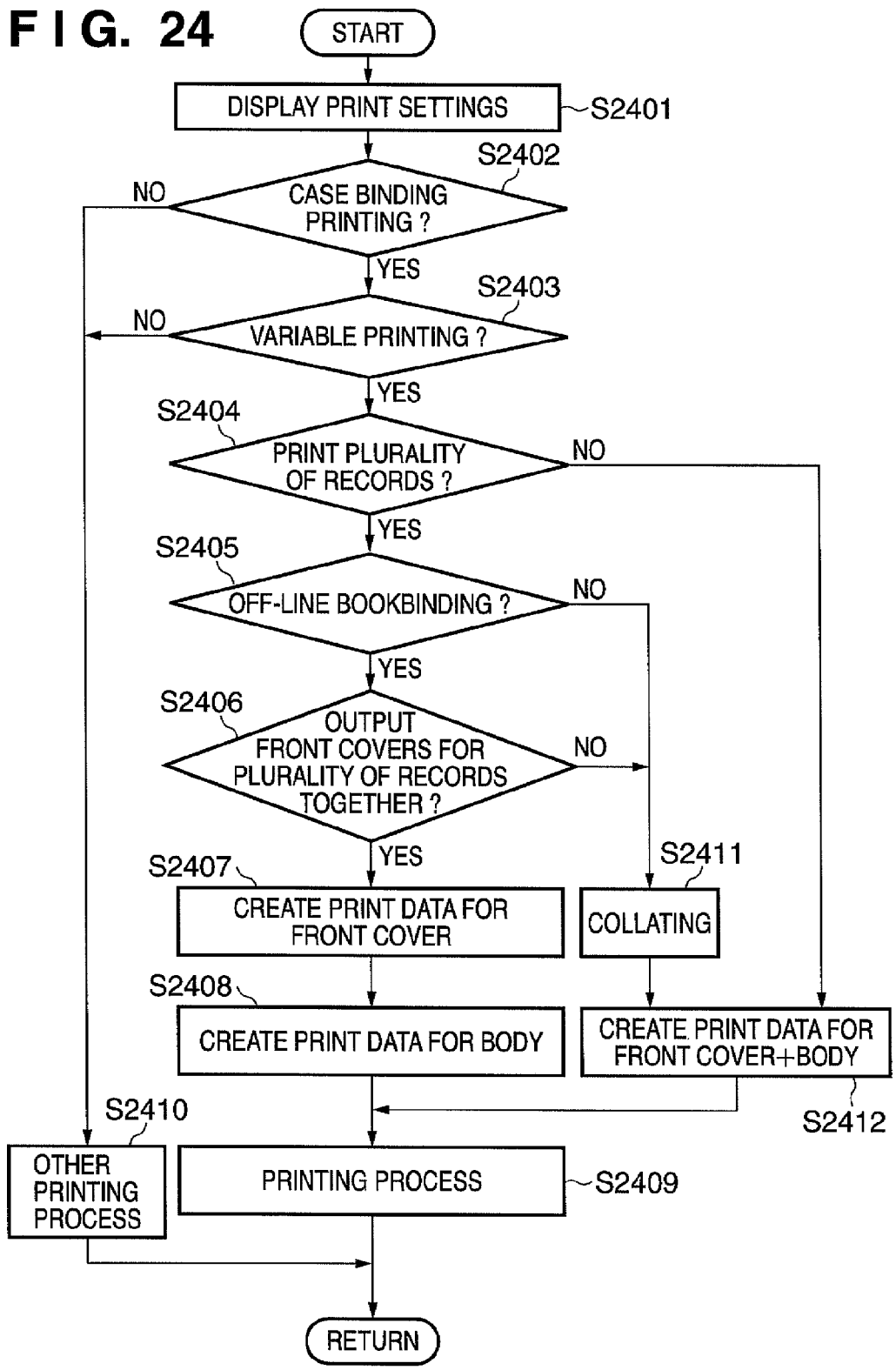
FIG. 24 is a flowchart of a portion of a method used in the preferred embodiments.

If printing with the bookbinding application 104 is desired, the user selects the Print control from the File menu. When a print instruction is input as a result, the procedure shown in FIG. 24 is executed by the bookbinding application 104. Firstly, a process S2401 is performed to display the print settings. This process involves displaying a Print Settings dialog box 2300 such as shown in FIG. 23. Here, the user sets the printer (printing apparatus), the number of copies, the print range, and the like. The user also sets variable printing. Setting that can be changed include Variable Printing 2304, in addition to Collate 2301, Do Not Collate Front Cover 2302, and Print Range 2303. If variable printing is set, the range of the records can be specified. These settings are of course saved as part of the print settings. If Variable Printing 2304 is set, print data is generated so that records read from a separately specified database are inserted into variable fields defined in document data to print. The other setting items are as described in the first embodiment.

After setting desired bookbinding settings, the user clicks the OK button to instruct the start of print data generation. This triggers a process S2402 for determining whether case-binding printing has been specified, with reference to the bookbinding settings in the saved print settings. If it is determined that case binding is set, a process S2403 is performed next to determine whether variable printing is set. If it is determined that variable printing is set, a process S2404 is performed next to determine whether there are a plurality of records to print. If the specified record range includes two or more records, it can be determined that printing of a plurality of records is specified. Print data is generated similarly to collated printing of the first embodiment, in the case where printing of a plurality of records is specified. If printing of a plurality of records is specified, a process S2405 is performed to determine whether bookbinding is off-line. If it is determined that bookbinding is off-line, a process S2406 is performed to determine whether to output the front covers for the plurality of records together. If a print setting equivalent to Print Front Covers Together 2305 in FIG. 23 is set, it is determined at step S2406 that the condition is met (S2406: YES). Note that this setting may be combined with the setting item 2302.

When printing of the front covers for a plurality of records together is set, a process S2407 is performed next to create print data for the front cover. This process involves the bookbinding application 104 creating the print data of the front cover portion. Here, as shown above, the bookbinding application 104 creates data that allocates a pair of logical pages (Z, A) for the front of the front cover and a pair of logical pages (B, Y) for the back of the front cover to a front cover sheet of specified size. Note that the question of whether to generate this front cover data for one sheet or for the plurality of records depends on the capacity of the printing apparatus.

Next, a process S2408 is performed to create print data for the body. This process involves creating the body data in page order (i.e., 1 2 3 ..., etc.), following the front cover. Here, as shown above, the bookbinding application 104 creates the print data of the body, other than the data for the front (Z, A) and back (B, Y) of the front cover. Note that the variable data of the records is allocated to the variable fields in the body data. Similarly to the front cover, the question of whether to create body data for one copy or for the plurality of records, excluding the logical pages to lay out on the front cover, depends on the capacity of the printing apparatus.

A printing process S2409 is then performed. This process involves transmitting the created print data for the front cover and the body to the printing apparatus. Therefore, the plurality of records of print data for the front cover generated by the bookbinding application 104 is issued to the printing apparatus. The print data for the body generated by the bookbinding application 104 and a command instructing collated printing are also issued to the printing apparatus. If the printing apparatus is unable to issue the collate command in the middle of a print job, the print job is divided into front cover and body. These commands are processed by the printing apparatus or the printer driver.

At the process S2407 for creating print data for the front cover and the process S2408 for creating print data for the body, it is also possible to create and transmit print data repeated for the plurality of records. This is performed if the printing apparatus or the printer driver does not have a collate command or has a collate command but is unable to switch to collate in the middle of a print job, or if the user do not want to divide the print job into a plurality of print jobs. The printing result shown in FIG. 21 can thus be obtained.

If it is determined in step S2404 that printing of a plurality of records is not specified, the processing branches step S2412, where the bookbinding application 104 generates print data equivalent to the front cover portion and the body portion in collated form. If it is determined at step S2405 that bookbinding is not off-line, or it is determined at step S2406 to also collate the front cover for the plurality of records, the bookbinding application 104 at step S2411 performs collating to generate print data for printing the front cover and the body together in collated form for each record. That is, the bookbinding application 104 generates print data composed of the front cover, first page, second page, and so on to be repeatedly printed for the plurality of records.

As described above, the present embodiment enables the body portion and the front cover portion to be generated separately if variable printing is specified as part of the print settings. Specifically, print data can be generated with the front cover uncollated and the body collated. Here, print data does not merely show the content to print but includes commands specifying to the printer driver or the printing apparatus whether collated or uncollated printing is set in the print settings.

Thus, if case binding is performed using an off-line bookbinding device, the operator is able to start the bookbinding operation by setting a stack of collated sheets for the body in the body tray and a stack of uncollated sheets for the front cover in the front cover tray. As a result, the work for the operator can be reduced.

Third Embodiment

According to the third embodiment, it is possible with the bookbinding application 104 to print the front cover and the body on separate printing apparatuses, and to set print settings for the front cover only or the body only. This processing flow will be described using FIG. 26. Assume that the importing of the data shown in FIG. 15, the setting of case binding shown in FIG. 16 has been performed, similarly to the first embodiment.

Figure 25:
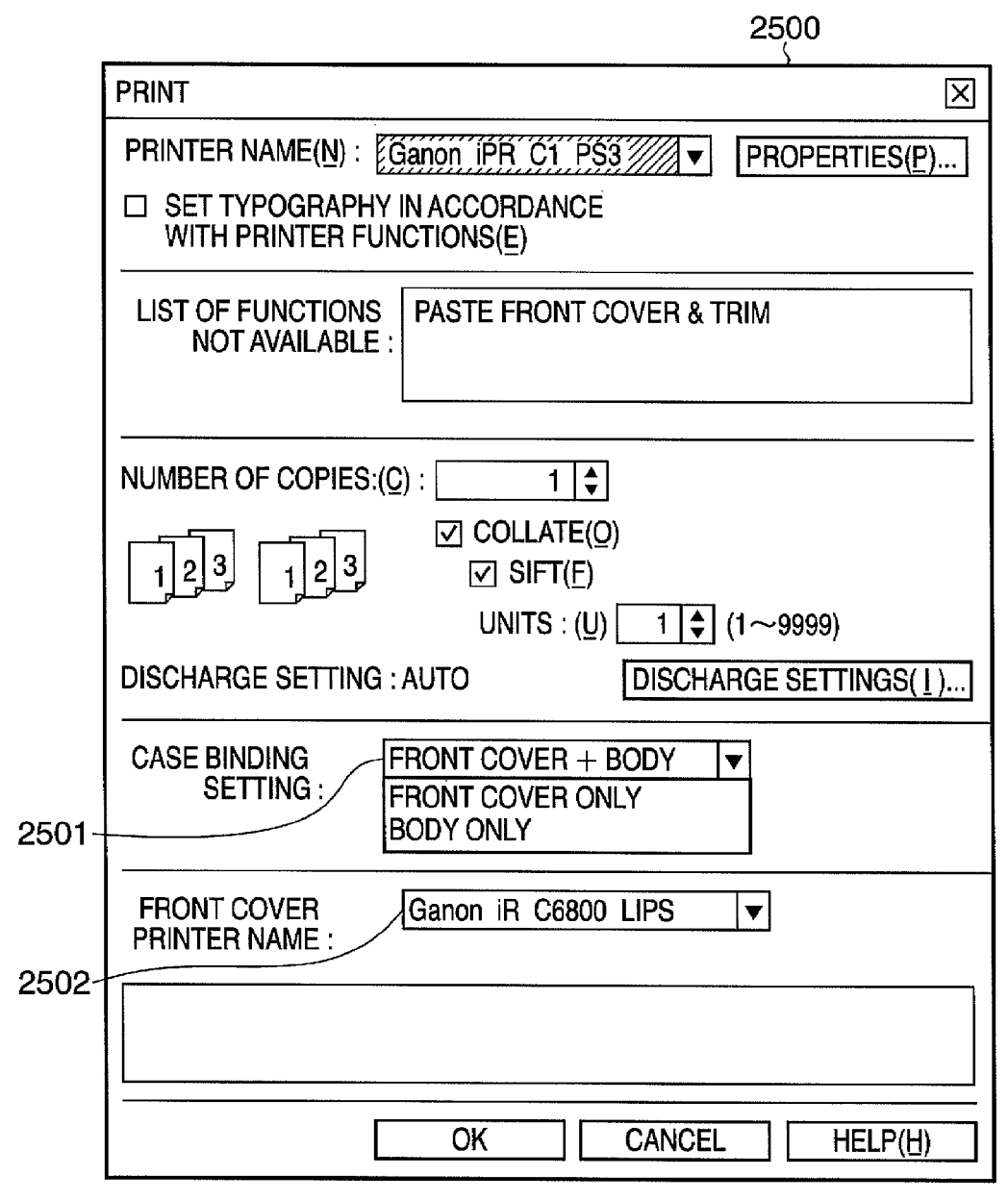

When the user selects the Print control from the File menu in order to print with the bookbinding application 104, firstly a process S2601 is performed to display the print settings. This process involves the bookbinding application 104 displaying a Print Settings dialog box 2500 such as shown in FIG. 25. Here, the user sets the printer, the number of copies, the print range, variable printing, and the like. A process S2602 is performed next to determined whether case-binding printing is set. This process involves determining whether case binding is set. If case binding is set in the UI illustrated in FIG. 16, it is determined that case binding is set. Next, a process S2603 is performed to display the case binding print settings. This process involves the bookbinding application 104 performing a display particular to case binding such as Case Binding Print Settings 2501 in FIG. 25. Here, "Front cover+body", "Front cover only", and "Body only" are displayed, enabling the user to make a selection. The next process is triggered by clicking the OK button.

If "Front cover+body" in FIG. 25 is selected, it is determined at step S2604 that printing of the front cover and the body is specified, and a process S2610 is performed to display the front cover device setting. At this step, the bookbinding application 104 displays a user interface for accepting selection of a printing apparatus to print the front cover. A process 2611 to select the front cover device is performed next. The bookbinding application 104 accepts selection of a printing apparatus for the front cover, on the user interface displayed at step S2610. A Front Cover Printer Name control 2502 in FIG. 25 illustrates this. Here, the bookbinding application 104 selects a printing apparatus to use in printing the front cover in accordance with a user instruction, separately to the device specified with the Print control in normal printing.

Here, when a printing apparatus is selected and the selection is confirmed by clicking the OK button, a process 2612 is performed to create print data for the front cover. The bookbinding application 104 creates the print data of the front cover portion. Here, the bookbinding application 104 creates data that allocates (Z, A) to the front of the front cover and (B, Y) to the back as shown above.

Next, a process S2613 is performed to determine whether to print the front cover only. This process involves determining whether the print setting selected above is "Front cover only", since print data creation is ended if "Front cover only" has been selected, and the printing process (transmission process) is performed. If a setting other than "Front cover only" has been selected, such as "Front cover+body", for example, a process S2607 is performed next to create print data for the body. This process involves creating body data, following the front cover. Here, as shown above, the bookbinding application 104 creates body data, other than the data for the front (Z, A) and back (B, Y) of the front cover.

A printing process S2608 is then performed. This process involves transmitting print data for the front cover and the body created above to the specified printing apparatuses. The generated data for the front (Z, A) and back (B, Y) of the front cover is transmitted to the printing apparatus for the front cover specified above, while the data for the body is transmitted to the printing apparatus specified by the Printer Name control, similarly to normal printing. Separate print jobs are generated where the printing apparatuses differ, and transmitted to the respective printing apparatus.

If it is determined at step S2604 that "Front cover+body" is not specified, it is determined at step S2605 whether "front cover only" has been selected. If "Front cover only" has been selected, the processing branches to step S2610. On the other hand, if "Front cover only" has not been selected, it is determined at step S2606 whether "Body only" has been selected. If "Body only" has been selected, the processing proceeds to step S2607.

The above configuration and processing procedure enables the front cover and body included in one document file to be printed on different printing apparatuses using a single print instruction. Thus, in the case where different functions are required in printing the front cover and body, printing apparatuses tailored to these respective functions can thus be used without needing to instruct printing separately for the front cover and the body. The productivity of the printing process can thus be improved.

Additional Embodiments

Note that the present invention may be applied to a system constituted by a plurality of devices (e.g., host computer, interface device, reader, printer, etc.), or to an apparatus composed of a single device (e.g., copier, facsimile apparatus, etc.). The object of the present invention is achieved by supplying a storage medium storing program code for realizing the functions of the foregoing embodiments to a system or apparatus, and reading and executing the program code stored on the storage medium with a computer of the system or apparatus. In this case, the actual program code read from the storage medium realizes the functions of the foregoing embodiments, and the actual program code and the storage medium storing the program code embody the present invention.

Further, the present invention, while described above in terms of the processing of a bookbinding application, may also be applied to a printer driver. In this case, the printer driver generates a print job for the body in uncollated form and a print job for the front cover in collated form with a single print instruction from the user. Note that when the printer driver is the subject of the flowcharts of FIGS. 22 and 24, print data generated in FIGS. 22 and 24 is equivalent to a print job.

The present invention may also be applied to the case where an operating system (OS) or the like running on a computer performs part or all of the actual processing based on instructions in the program code, with the functions of the foregoing embodiments being realized by this processing. Further, the present invention is also applicable to the case where the program code read from the storage medium is written to a memory provided in a function expansion card inserted into the computer or a function expansion unit connected to the computer. In this case, a CPU or the like provided in the function expansion card or the function expansion unit performs part or all of the actual processing based on instructions in the written program code, with the functions of the foregoing embodiments being realized by this processing.

A further embodiment of the present invention provides an information-processing apparatus comprising: setting means for setting, as part of a print setting when printing document data that includes a plurality of pages to print, a bookbinding setting for casing a sheet printed with a page to be used for a body out of the plurality of pages with a sheet printed with a page to be used for a front cover out of the plurality of pages; and generating means for generating, if the bookbinding setting is set, body print data for repeatedly printing, in collated form, a first page to a last page of the body in the document data for a specified plurality of records, and front cover print data for outputting the front cover for a number of sheets equivalent to the specified plurality of records.

A further embodiment of the present invention provides an information-processing method in an information-processing apparatus that has setting means and generating means, comprising: a setting step of setting, as part of a print setting when printing document data that includes a plurality of pages to print, a bookbinding setting for casing a sheet printed with a page to be used for a body out of the plurality of pages with a sheet printed with a page to be used for a front cover out of the plurality of pages; and a generating step of generating, if the bookbinding setting is set, body print data for repeatedly printing, in collated form, a first page to a last page of the body in the document data for a specified plurality of records, and front cover print data for outputting the front cover for a number of sheets equivalent to the specified plurality of records.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-156738, filed Jun. 13, 2007, which is hereby incorporated by reference herein in its entirety.

What is claimed is:

1. An information-processing apparatus comprising:
    a setting unit configured to set, as part of a print setting when printing document data that includes a plurality of pages to be printed, a bookbinding setting for causing printed pages for a body to be cased with a printed page for a front cover; and
    a generating unit configured to generate:
        if the bookbinding setting is set and a post processing device whose paper transport path is not connected to a printing apparatus is used, body print data for printing the pages of the body in the document data in collated form based on a specified plurality of copies, and front cover print data for printing the page of the front cover in the document data based on the specified plurality of copies; and if the bookbinding setting is set and the post processing device whose paper transport path is connected to the printing apparatus is used, print data for printing both the page of the body and the page of the front cover in the document data in collated form based on the specified plurality of copies.

2. The information-processing apparatus according to claim 1, further comprising a transmitting unit for transmitting the print data generated by the generating unit to the printing apparatus.

3. The information-processing apparatus according to claim 2, wherein:

the generating unit configured to generate the body and the front cover for different printing apparatuses, and the transmitting unit is configured to transmit the print data for the body and the print data for the front cover generated by the generating unit to different printing apparatuses.

4. The information-processing apparatus according to claim 1, further comprising:

a converting unit for converting the print data generated by the generating unit to a print job using a printer driver; and a transmitting unit for transmitting the print job converted by the converting unit to the printing apparatus.

5. The information-processing apparatus according to claim 1, wherein the generating unit is adapted to generate the print data separately for the body and the front cover if the bookbinding setting is set and the post processing device whose paper transport path is not connected to the printing apparatus is used.

6. The information-processing apparatus according to claim 5, wherein the bookbinding setting for case-binding printing for casing and binding a printed sheet as part of the body, sets the printed page of the front cover that is twice the size of the sheet printed as part of the body.

7. An information-processing method for an information-processing apparatus, the method comprising the steps of:

setting, as part of a print setting when printing document data that includes a plurality of pages to be printed, a bookbinding setting for causing printed pages for a body to be cased with a printed page for a front cover; and generating:

if the bookbinding setting is set and a post processing device whose paper transport path is not connected to a printing apparatus is used, body print data for printing the pages of the body in the document data in collated form based on a specified plurality of copies, and front cover print data for printing the page of the front cover in the document data based on the specified plurality of copies; and if the bookbinding setting is set and the post processing device whose paper transport path is connected to the printing apparatus is used, print data for printing both the page of the body and the page of the front cover in the document data in collated form based on the specified plurality of copies.

8. A non-transitory storage medium storing a computer program for causing an information-processing apparatus to perform a method comprising the steps of:

setting, as part of a print setting when printing document data that includes a plurality of pages to be printed, a bookbinding setting for causing printed pages for a body to be cased with a printed page for a front cover; and generating:

if the bookbinding setting is set and a post processing device whose paper transport path is not connected to a printing apparatus is used, body print data for printing the pages of the body in the document data in collated form based on for a specified plurality of copies, and front cover print data for printing the page of the front cover in the document data based on the specified plurality of copies; and if the bookbinding setting is set and the post processing device whose paper transport path is connected to the printing apparatus is used, print data for printing both the page of the body and the page of the front cover in the document data in collated form based on the specified plurality of copies.

* * * * *